US009513904B2

(12) United States Patent
Godard et al.

(10) Patent No.: US 9,513,904 B2
(45) Date of Patent: Dec. 6, 2016

(54) COMPUTER PROCESSOR EMPLOYING CACHE MEMORY WITH PER-BYTE VALID BITS

(71) Applicant: Mill Computing, Inc., Palo Alto, CA (US)

(72) Inventors: Roger Rawson Godard, East Palo Alto, CA (US); Arthur David Kahlich, Sunnyvale, CA (US)

(73) Assignee: MILL COMPUTING, INC., Palo Alto, CA (US)

( * ) Notice: Subject to any disclaimer, the term of this patent is extended or adjusted under 35 U.S.C. 154(b) by 185 days.

(21) Appl. No.: 14/515,178

(22) Filed: Oct. 15, 2014

(65) Prior Publication Data
US 2015/0106567 A1    Apr. 16, 2015

Related U.S. Application Data

(60) Provisional application No. 61/890,891, filed on Oct. 15, 2013.

(51) Int. Cl.
*G06F 9/30* (2006.01)
*G06F 12/08* (2016.01)
(Continued)

(52) U.S. Cl.
CPC ....... *G06F 9/30032* (2013.01); *G06F 9/30145* (2013.01); *G06F 12/0292* (2013.01);
(Continued)

(58) Field of Classification Search
CPC .............................. G06F 12/00; G06F 12/08
See application file for complete search history.

(56) References Cited

U.S. PATENT DOCUMENTS 5,542,058 A * 7/1996 Brown, III .............. G06F 9/383
  712/23
5,809,320 A * 9/1998 Jain ....................... G06F 9/3857
  712/34

(Continued)

OTHER PUBLICATIONS

A Primer on Memory Consistency and Cache Coherence, Daniel J. Sorin et al., Morgan & Claypool Publishers, Synthesis Lectures on Computer Architecture, 2011.

*Primary Examiner* — Ryan Bertram
(74) *Attorney, Agent, or Firm* — Gordan & Jacobson, P.C.

(57) ABSTRACT

A computer processing system with a hierarchical memory system that associates a number of valid bits for each cache line of the hierarchical memory system. The valid bits are provided for each cache line stored in a respective cache and make explicit which bytes are semantically defined and which are not for the associated given cache line. Memory requests to the cache(s) of the hierarchical memory system can include an address specifying a requested cache line as well as a mask that includes a number of bits each corresponding to a different byte of the requested cache line. The values of the bits of the byte mask indicate which bytes of the requested cache line are to be returned from the hierarchical memory system. The memory request is processed by the top level cache of the hierarchical memory system, looking for one or more valid bytes of the requested cache line corresponding to the target address of the memory request. The valid bytes of the cache line corresponding to the byte mask as stored in cache can be identified by reading out the valid bit(s) and data byte(s) stored by the cache for putative matching cache lines for those data bytes that are specified by the byte mask of the memory request, while ignoring the valid bit(s) and data byte(s) stored by the cache for putative matching cache lines for those data bytes that are not specified by the byte mask of the memory request. Extensions to shared multiprocessor systems is also described and claimed.

28 Claims, 13 Drawing Sheets

(51) Int. Cl.
  *G06F 12/02* (2006.01)
  *G06F 12/10* (2016.01)
(52) U.S. Cl.
  CPC ...... *G06F 12/0811* (2013.01); *G06F 12/0864* (2013.01); *G06F 12/0893* (2013.01); *G06F 12/1027* (2013.01); *G06F 12/0897* (2013.01); *G06F 12/1009* (2013.01); *G06F 2212/1024* (2013.01); *G06F 2212/1028* (2013.01); *G06F 2212/283* (2013.01); *G06F 2212/608* (2013.01); *G06F 2212/6032* (2013.04); *G06F 2212/684* (2013.01); *Y02B 60/1225* (2013.01)

(56) References Cited

U.S. PATENT DOCUMENTS

| | | | |
|---|---|---|---|
| 6,240,508 B1 * | 5/2001 | Brown, III | G06F 9/383 710/39 |
| 7,757,044 B2 | 7/2010 | Cypher et al. | |
| 8,347,034 B1 | 1/2013 | Chen et al. | |
| 9,047,197 B2 * | 6/2015 | Chou | |
| 2003/0033480 A1 * | 2/2003 | Jeremiassen | G06F 8/4442 711/118 |
| 2003/0126369 A1 * | 7/2003 | Creta | G06F 12/0804 711/133 |
| 2004/0103251 A1 | 5/2004 | Alsup | |
| 2006/0053254 A1 * | 3/2006 | Van Eijndhoven | G06F 12/0897 711/122 |
| 2006/0059309 A1 * | 3/2006 | Harada | G06F 12/0893 711/118 |
| 2009/0106495 A1 * | 4/2009 | Chou | G06F 9/3004 711/130 |
| 2010/0077151 A1 * | 3/2010 | Van De Waerdt | G06F 12/0804 711/132 |
| 2010/0299484 A1 * | 11/2010 | Hooker | G06F 12/0844 711/125 |
| 2011/0307663 A1 * | 12/2011 | Kultursay | G06F 17/5045 711/125 |
| 2012/0246410 A1 | 9/2012 | Xu | |
| 2013/0042076 A1 | 2/2013 | Lu et al. | |
| 2014/0032857 A1 | 1/2014 | Rajagopalan et al. | |
| 2014/0122810 A1 | 5/2014 | Bhoria et al. | |

* cited by examiner

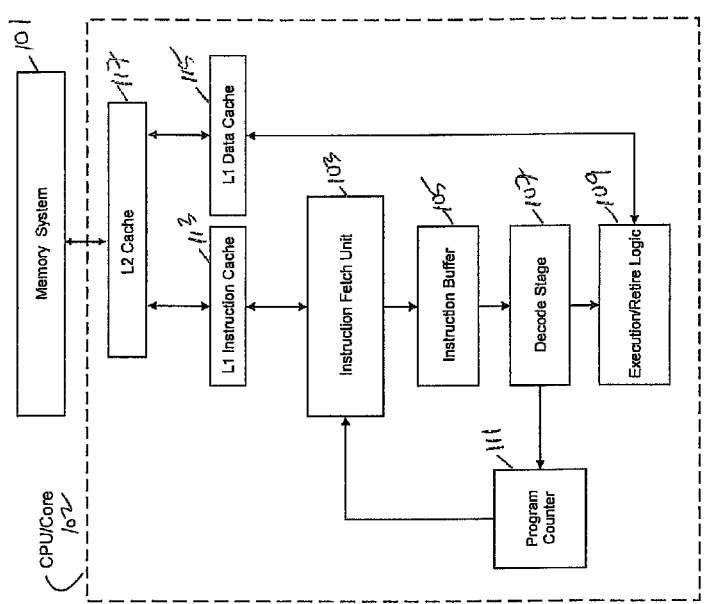
FIG. 1
FIG. 2

COMPUTER PROCESSOR EMPLOYING CACHE MEMORY WITH PER-BYTE VALID BITS

CROSS-REFERENCE TO RELATED APPLICATIONS

The present disclosure claims priority from U.S. Provisional Patent Appl. No. 61/890,891, filed on Oct. 15, 2013, entitled "Cache Support for a Computer Processor," herein incorporated by reference in its entirety.

BACKGROUND

1. Field

The present disclosure relates to computer processors (also commonly referred to as CPUs).

2. State of the Art

A computer processor (and the program which it executes) needs places to put data for later reference. A computer processor design will typically have many such places, each with its own trade off of capacity, speed of access, and cost. Usually these are arranged in a hierarchal manner referred to as the memory system of the processor, with small, fast, costly places used for short lived small data and large, slow and cheap places used for what doesn't fit in the small, fast, costly places. The memory system typically includes the following components arranged in order of decreasing speed of access:

register file or other form of fast operand storage;

one or more levels of cache memory (one or more levels of the cache memory can be integrated with the processor (on-chip cache) or separate from the processor (off-chip cache);

main memory (or physical memory), which is typically implemented by DRAM memory and/or NVRAM memory and/or ROM memory;

controller card memory; and on-line mass storage (typically implemented by one or more hard disk drives).

In many computer processors, the main memory of the memory system can take several hundred machine cycles to access. The cache memory, which is much smaller and more expensive but with faster access as compared to the main memory, is used to keep copies of data that resides in the main memory. If a reference finds the desired data in the cache (a cache hit) it can access it in a few machine cycles instead of several hundred when it doesn't (a cache miss). Because a program typically has nothing else to do while waiting to access data in memory, using a cache and making sure that desired data is copied into the cache can provide significant improvements in performance.

The cache granularity (the cache line) is chosen to optimize the transfer of data from external memory to and from cache memory. Typical cache line sizes are 32 or 64 bytes, significantly larger than the granularity of program access to data, which is commonly one to eight bytes.

The mismatch of granularity is not usually significant for loads of data. If the desired data is not found in cache, then the whole containing line is brought in from external memory and the load is satisfied from the relevant portion of the line. A subsequent load may reference a different part of the line and be satisfied rapidly from cache without another access to external memory. Similarly, a store to a location that is already resident in cache may be performed quickly by updating the cache line, without sending the new data values to the external memory.

However, stores to lines that are not cache resident (write misses) present a problem. If a store miss allocates a new line in cache and updates it with the stored value then the granularity disparity means that there will be unwritten bytes in the line. Such remaining unwritten bytes of the line have undefined value, and a subsequent load to the undefined portion would not return a correct value to the CPU core.

There are two well-known methods to avoid this write-miss problem. In the write-through method, all stores that do not hit in cache are sent to external memory without allocating a cache line, and cache lines are only allocated by a load. In the write-back method, store misses cause the target line to be read from external memory in the same way as a load, whereupon it can be updated with the stored value as if there had been no miss.

Each of these two methods can cause the program to incur significant costs. In the write-through method, multiple write misses to the same line increases traffic to external memory as each is written through. The extra traffic may be avoided by use of buffers that combine multiple stores to the same line, but then these must be checked in the same way as is needed for the write-back method, with the same power and complexity costs. In the write-back method case, the store value must be buffered until the desired line is read from external memory, and the buffer must be checked by subsequent loads and stores to provide semantically consistent behavior in the case of overlapping access; the buffering and checking is expensive in power

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a computer processing system with a hierarchical memory system that associates a number of valid bits for each cache line of the hierarchical memory system. The valid bits are provided for each cache line stored in a respective cache and make explicit which bytes are semantically defined and which are not for the associated given cache line.

Memory requests to the cache(s) of the hierarchical memory system can include an address specifying a requested cache line as well as a mask that includes a number of bits each corresponding to a different byte of the requested cache line. The values of the bits of the byte mask indicate which bytes of the requested cache line are to be returned from the hierarchical memory system. The memory request is processed by the top level cache of the hierarchical memory system, looking for one or more valid bytes of the requested cache line corresponding to the target address of the memory request. The valid bytes of the cache line corresponding to the byte mask as stored in cache can be identified by reading out the valid bit(s) and data byte(s) stored by the cache for putative matching cache lines for those data bytes that are specified by the byte mask of the memory request, while ignoring the valid bit(s) and data byte(s) stored by the cache for putative matching cache lines for those data bytes that are not specified by the byte mask of the memory request.

In one embodiment, the cache of the hierarchical memory system can be an associative structure that stores a plurality of cache lines along with a tag for each cache line. The cache can be further configured to process memory requests by comparing the tag of the cache line address of the memory request to the tag of the cache line stored by the cache that putatively matches the cache line address of the memory request. The cache can be further configured to generate a plurality of per-byte hit/miss signals based on the processing of the valid bits of the accessed cache line and the tag comparison of the tag of the accessed cache line, wherein the plurality of per-byte hit/miss signals correspond to the number of data bytes in a given cache line. The per-byte hit/miss signals can indicate whether the cache stores a corresponding valid data byte for the cache line corresponding to the cache line address but only for those data bytes specified by the byte mask of the memory request. The cache can be further configured to output valid data bytes for the cache line corresponding to the cache line address of the memory request but only for those data bytes specified by the byte mask of the memory request.

In another embodiment, the cache can include at least one buffer and at least one cache array for storing cache lines, where the at least one buffer stores valid data bytes for newly written cache lines as well as cache lines newly evicted from the at least one cache array. The cache can process a store request by writing the valid data bytes provided as part of the store request to the at least one buffer and marking such data bytes as dirty. In the event that the at least one cache array stores valid data bytes for the cache line specified by the store request, the cache can further process the store request by merging valid data bytes of the cache line as stored in the buffer with the valid data bytes stored in the at least one cache array. The cache can further processes the store request by writing valid data bytes of the cache line as stored in the buffer into the at least one cache array and marking such data bytes as clean. The cache can also be configured to lower valid data bytes of an evicted cache line marked as dirty as stored in the at least one buffer to a lower level of the hierarchical memory system. The lower level of the hierarchical memory system ca be configured to store the valid data bytes of the evicted cache line marked as dirty as lowered by the cache by overwriting any corresponding cache line or creating a new cache line and marking it dirty. The cache can also be configured to process a load request by accessing both the at least one buffer and the at least one cache array to determine if either one stores valid data bytes for the cache line specified by the cache line address of the load request. The cache can further process the load request by issuing a read request to the next lower level in the hierarchical memory system, where the read request specifies a number of data bytes for the requested cache line that missed in both the at least one buffer and the at least one cache array of the cache. The lower level of the hierarchical memory system can be configured to hoist valid data bytes of the requested cache line as specified in the read request that hit in the lower level of the hierarchical memory system for storage in the at least one cache. The cache can be configured to carry out a byte-wide merger process with respect to the valid data bytes for a given cache line as hoisted from the lower level of the hierarchical memory system and the valid data bytes for the given cache line as stored in the at least one cache array.

In another aspect, a shared memory multiprocessor system is provided that employs a plurality of processors with a hierarchical memory system that includes at least one private cache per processor and shared memory resources. The at least one private cache of each given processor stores a plurality of cache lines as well as a plurality of valid bits for each cache line, wherein each cache line includes a plurality of data bytes, and wherein the plurality of valid bits for a given cache line correspond to the plurality of data bytes of the given cache line and provide an indication of the validity of the corresponding data bytes of the given cache line. The private caches of the hierarchical memory system are coupled to one another by an interconnect network. The at least one private cache of each given processor is configured to carry out a cache coherence protocol that allows the private caches for different processors to hold the same cache line in modified state so long as the sets of valid bits held by the respective private caches for the different processors are disjoint with respect to one another. Exemplary operations of the cache coherence protocol are also described and claimed.

BRIEF DESCRIPTION OF THE DRAWINGS

FIG. 1 is a schematic block diagram of a computer processing system according to an embodiment of the present disclosure.

FIG. 2 is a schematic diagram of exemplary pipeline of processing stages that can be embodiment by the computer processor of FIG. 1.

DETAILED DESCRIPTION OF THE PREFERRED EMBODIMENTS

Figure 3:
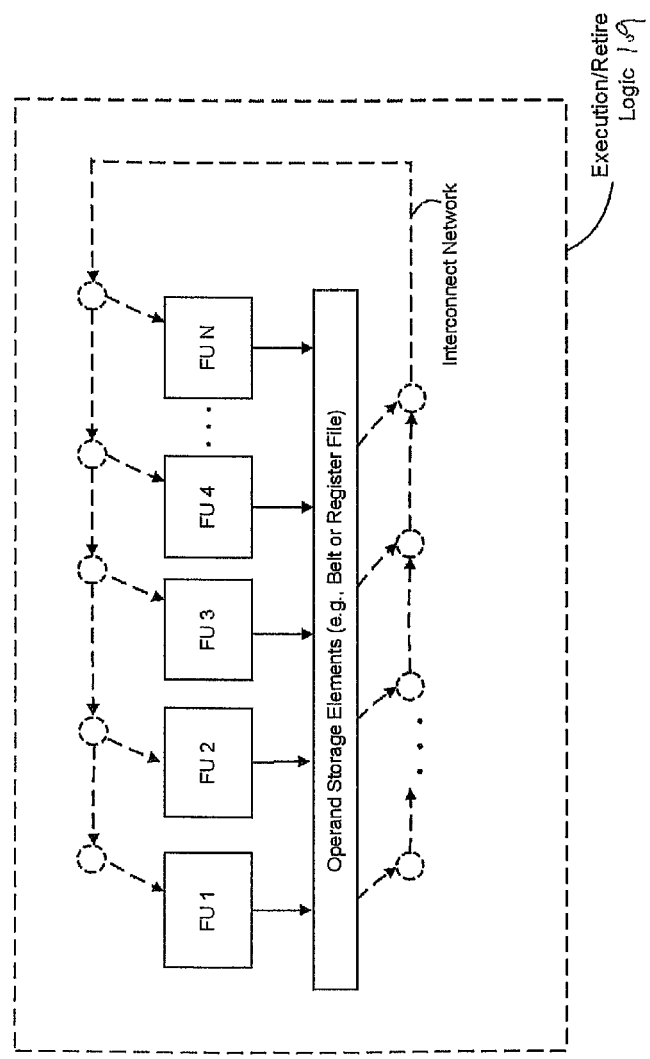
FIG. 3 is schematic illustration of components that can be part of the execution/retire logic of the computer processor of FIG. 1 according to an embodiment of the present disclosure.

Illustrative embodiments of the disclosed subject matter of the application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, the term "operation" is a unit of execution, such as an individual add, load, store or branch operation.

The term "instruction" is a unit of logical encoding including zero or more operations. For the case where an instruction includes multiple operations, the multiple operations are semantically performed together.

The term "hierarchical memory system" is a computer memory system storing instructions and operand data for access by a processor in executing a program where the memory is organized in a hierarchical arrangement of levels of memory with increasing access latency from the top level of memory closest to the processor to the bottom level of memory furthest away from the processor.

The term "cache line" or "cache block" is a unit of memory that is accessed by a computer processor. The cache line includes a number of bytes (typically 4 to 128 bytes).

The computer processing system of the present application addresses the granularity disparity between cache line sizes and program access to data (the cause of write miss problems) by adding a number of valid bits to each cache line of a hierarchical memory system. The valid bits are provided for each cache line stored in a respective cache and make explicit which bytes are semantically defined and which are not for the associated given cache line. In this manner, each cache of the hierarchical memory system stores a number of valid bits for each cache line. The valid bits corresponding to a given cache line indicate which bytes are valid (semantically defined) and which bytes are not valid (not semantically defined) for the given cache line.

In accordance with the present application, a processor is configured with execution logic that includes a load unit that executes load operations. The load operations can be specified by instructions processed by the processor. The execution of a given load operation involves the generation of a load request this communicated to the hierarchical memory system. The load request includes an address specifying a requested cache line as well as a mask (referred to herein as a "byte mask") that includes a number of bits each corresponding to a different byte of the requested cache line. The values of the bits of the byte mask indicate which bytes of the requested cache line are to be returned from the hierarchical memory system. The load request is processed by the top level cache of the hierarchical memory system, looking for one or more valid bytes of the requested cache line corresponding to the target address of the load request. The valid byte(s) of the cache line corresponding to the byte mask as stored in cache can be identified by reading out the valid bit(s) and data byte(s) stored by the cache for putative matching cache lines for those data bytes that are specified by the byte mask of the load request, while ignoring the valid bit(s) and data byte(s) for such putative matching cache lines for those data bytes that are not specified by the byte mask of the load request. Thus, the valid bit(s) and corresponding data byte(s) as specified by the byte mask for putative matching cache lines are read out from the cache memory, and the valid bit(s) and corresponding data byte(s) that are not specified by the byte mask for putative matching cache lines are not read out from the cache memory. The valid bit(s) read out from the cache memory are used to generate per-byte hit/miss signals for the cache. The data byte(s) read out from the cache memory are feed to a multiplexer circuit that is controlled by the per-byte hit miss signals to selectively output the valid data byte(s) stored in the cache for the requested cache line where such output data bytes are specified by the byte mask of the load request.

For example, if a cache line can include four possible valid bytes—byte 0, byte 1, byte 2, byte 3, the byte mask can be used to identify byte 2 and byte 3 of a given cache line. The valid bytes 2 and 3 of the cache line corresponding to the byte mask as stored in the cache are identified by reading out from the cache only the valid bit(s) for bytes 2 and 3 as well as the data bytes 2 and 3, themselves, for the requested cache line. The valid bit(s) for bytes 1 and 4 as well as the data bytes 1 and 4, themselves, for the requested cache line are not read out from the cache array. The valid bits for bytes 2 and 3 as read out from the cache memory are used to generate per-byte hit signals for bytes 2 and 3 and per-byte miss signals for bytes 1 and 4. The data byte(s) 2 and 4 read out from the cache memory are feed to a multiplexer circuit that is controlled by the per-byte hit signals for bytes 2 and 3 to selectively output the valid data byte(s) 2 and 3 stored in the cache for the requested cache line.

Any valid data byte(s) that is (are) retrieved from the cache is (are) returned to the execution logic for satisfaction of the load request, and the corresponding mask bits in the request are cleared. If all bits of the byte mask have been cleared, then the load request has been fully satisfied and further checks in the memory hierarchy are skipped. If any bits remain set in the byte mask, this indicates that one or more bytes desired by the load request have not yet been satisfied. In this case, a load request is issued to the next lower level cache of the memory hierarchy employing the updated byte mask. The next lower level cache of the memory hierarchy can repeat these operations to check for storage of the remaining bytes as specified by the byte mask of the load request. In the event that requested bytes remain unsatisfied after checking all cache levels, then the request cache line can be read the line from main memory (a cache fill) in order to satisfy the remaining desired bytes from the cache line. Thus a single load request may be satisfied by bytes obtained from several different caches and/or main memory.

The execution logic of the processor also includes a store unit that executes store operations. The store operations can be specified by instructions processed by the processor. The execution of a given store operation involves the generation of a store request communicated to the hierarchical memory system. The store request includes an address specifying a cache line, one or more bytes of data to store in such cache line, and a byte mask that specifies where the one or more bytes are to be written into such cache line. The store request is processed by the top level cache of the hierarchical memory system. In processing the store request, the target cache line is looked up, and if found there (a write hit), the byte mask is used to store the data byte(s) of the load request in the target cache line with the appropriate byte offset. Furthermore, the valid bits of the target cache line are set only for the written data bytes that are specified by the byte mask. If the target line is not found, (a write miss) then a new cache line is allocated in the cache, with all valid bits cleared, and then the store request proceeds as if there had been a write hit to the newly allocated line. The byte mask is used to store the data byte(s) of the load request in the target cache line with the appropriate byte offset. Furthermore, the valid bits of the target cache line are set only for the written data bytes that are specified by the byte mask. Due to the disparity between access size and line size, it is possible that the new cache line will only have a few of the valid bits set.

In some cache designs, the top level cache is write-through and new lines are not allocated there after a write miss. In such designs, write-miss allocation occurs at a lower level in the hierarchical memory system, but is otherwise as described above.

It is common for cache lines to be moved or copied between levels of the hierarchical memory system. An example is the cache fill from main memory that results from a load request miss. In the context of the present application, it is possible for the same cache line to reside at several different levels of cache in the hierarchical memory system, usually with different but possibly overlapping combinations of valid bits. Thus, whenever a cache line is moved or copied to a level of cache that already contains a version of the same line then the incoming cache line must be merged with the resident cache line. Of the two cache lines, one is or was resident at a higher level (closer to the CPU) in the hierarchy than the other. The merger proceeds byte-by-byte based on the corresponding valid bits of corresponding bytes of the two cache lines. If neither cache line has a set valid bit for some byte then the result also does not have the valid bit set and the byte value is undefined. If one cache line has a set valid bit and the other does not, then the result has the valid bit set and the byte value is taken from the cache line in which the byte was marked valid. If both cache lines have the valid bit set, the result will also have the valid bit set, and the byte value will be that of the cache line that was higher in the hierarchical memory system. These rules ensure that a load request, searching from the top of the hierarchical memory system, will find the most recently written value for each byte of the load request.

The effect of the memory access operations described herein is that store requests cannot miss, obviating the excess traffic of write-through designs and the buffering of write-back designs. Instead a new empty cache line will be allocated in cache and updated instead.

It is common in cache designs that each cache line is associated with a single dirty bit that indicates whether the cache line contains newly written data that is not reflected in copies of the cache line that are lower in the cache of the hierarchical memory system or in main memory. When a dirty cache line must be evicted to make room in the cache then the dirty bit tells whether the cache line must be lowered to a lower level (and merged with any copy already resident there, setting the newly merged cache line as dirty in the process) or can be simply discarded.

Laning memory interfaces can be used to interface to main memory. In this case, it is possible to write only selected bytes of a cache line to main memory rather than whole cache lines, at a savings of power and time. The valid bits are advantageous when a dirty line must be lowered to a laning main memory, i.e. written out, because only the valid bytes need to be written.

Lowering a line costs power and bandwidth, and so is to be avoided if possible. The memory access operations described above can be augmented so as to reduce the propagation of dirty lines. In the augmentation, any time that valid (as indicated by the valid bits) data is overwritten by new data, either by a store operation executed by the CPU or as a result of lowering, the former and new values of the overwritten bytes are compared (overwrite compare). If the compared bytes have equal value, then the cache line is not marked as dirty as a result of the overwrite; of course the line may have already been dirty, and in which case it remains so, and the comparison may be omitted to save power.

In accordance with the present disclosure, a sequence of instructions is stored in the memory system 101 and processed by a CPU (or Core) 102 as shown in the exemplary embodiment of FIG. 1. The CPU (or Core) 102 includes a number of instruction processing stages including at least one instruction fetch unit (one shown as 103), at least one instruction buffer or queue (one shown as 105), at least one decode stage (one shown as 107) and execution/retire logic 109 that are arranged in a pipeline manner as shown. The CPU (or Core) 102 also includes at least one program counter (one shown as 111), at least one L1 instruction cache (one shown as 113), an L1 data cache 115 and a shared instruction/data L2 Cache 117.

The L1 instruction cache 113, the L1 data cache 115 and the L2 cache are logically part of the hierarchy of the memory system 101. The L1 instruction cache 113 is a cache memory that stores copies of instruction portions stored in the memory system 101 in order to reduce the latency (i.e., the average time) for accessing the instruction portions stored in the memory system 101. In order to reduce such latency, the L1 instruction cache 113 can take advantage of two types of memory localities, including temporal locality (meaning that the same instruction will often be accessed again soon) and spatial locality (meaning that the next memory access for instructions is often very close to the last memory access or recent memory accesses for instructions). The L1 instruction cache 113 can be organized as a set-associative cache structure, a fully associative cache structure, or a direct mapped cache structure as is well known in the art. Similarly, the L1 data cache 115 is a cache memory that stores copies of operands stored in the memory system 101 in order to reduce the latency (i.e., the average time) for accessing the operands stored in the memory system 101. In order to reduce such latency, the L1 data cache 115 can take advantage of two types of memory localities, including temporal locality (meaning that the same operand will often be accessed again soon) and spatial locality (meaning that the next memory access for operands is often very close to the last memory access or recent memory accesses for operands). The L1 data cache 115 can be organized as a set-associative cache structure, a fully associative cache structure, or a direct mapped cache structure as is well known in the art. The shared L2 Cache 117 stores both instructions and data. The L2 cache 117 can be organized as a set-associative cache structure, a fully associative cache structure, or a direct mapped cache structure as is well known in the art. The hierarchy of the memory system 201 can also include additional levels of cache memory, such as a level 3 cache, as well as main memory. One or more of these additional levels of the cache memory can be integrated with the CPU 202 as is well known. The details of the organization of the memory hierarchy are not particularly relevant to the present disclosure and thus are omitted from the figures of the present disclosure for sake of simplicity.

The program counter 111 stores the memory address for a particular instruction and thus indicates where the instruction processing stages are in processing the sequence of instructions. The memory address stored in the program counter 111 can be used to control the fetching of the instructions by the instruction fetch unit 103. Specifically, the program counter 111 can store the memory address for the instruction to fetch. This memory address can be derived from a predicted (or resolved) target address of a control-flow operation (branch or CALL operation), the saved address in the case of a RETURN operation, or the sum of memory address of the previous instruction and the length of previous instruction. The memory address stored in the program counter 111 can be logically partitioned into a number of high-order bits representing a cache line address ($ Cache Line) and a number of low-order bits representing a byte offset within the cache line for the instruction.

The instruction fetch unit 103, when activated, sends a request to the L1 instruction cache 113 to fetch a cache line from the L1 instruction cache 113 at a specified cache line address ($ Cache Line). This cache line address can be derived from the high-order bits of the program counter 111. The L1 instruction cache 113 services this request (possibly accessing lower levels of the memory system 101 if missed in the L1 instruction cache 113), and supplies the requested cache line to the instruction fetch unit 103. The instruction fetch unit 103 passes the cache line returned from the L1 instruction cache 113 to the instruction buffer 105 for storage therein.

The decode stage 107 is configured to decode one or more instructions stored in the instruction buffer 105. Such decoding generally involves parsing and decoding the bits of the instruction to determine the type of operation(s) encoded by the instruction and generate control signals required for execution of the operation(s) encoded by the instruction by the execution/retire logic 109.

The execution/retire logic 109 utilizes the results of the decode stage 107 to execute the operation(s) encoded by the instructions. The execution/retire logic 109 can send a load request to the L1 data cache 115 to fetch data from the L1 data cache 115 at a specified memory address. The L1 data cache 115 services this load request (possibly accessing the L2 cache 117 and lower levels of the memory system 101 if missed in the L1 data cache 115), and supplies the requested data to the execution/retire logic 109. The execution/retire logic 109 can also send a store request to the L1 data cache 115 to store data into the memory system at a specified address. The L1 data cache 115 services this store request by storing such data at the specified address (which possibly involves overwriting data stored by the data cache and lowering the stored data to the L2 Cache 117 and lower levels of the hierarchical memory system).

The instruction processing stages of the CPU (or Core) 102 can achieve high performance by processing each instruction and its associated operation(s) as a sequence of stages each being executable in parallel with the other stages. Such a technique is called "pipelining." An instruction and its associated operation(s) can be processed in five stages, namely, fetch, decode, issue, execute and retire as shown in FIG. 2.

In the fetch stage, the instruction fetch unit 103 sends a request to the L1 instruction cache 113 to fetch a cache line from the L1 instruction cache 113 at a specified cache line address ($ Cache Line). The instruction fetch unit 103 passes the cache line returned from the L1 instruction cache 113 to the instruction buffer 105 for storage therein.

The decode stage 107 decodes one or more instructions stored in the instruction buffer 107. Such decoding generally involves parsing and decoding the bits of the instruction to determine the type of operation(s) encoded by the instruction and generating control signals required for execution of the operation(s) encoded by the instruction by the execution/retire logic 109.

In the issue stage, one or more operations as decoded by the decode stage are issued to the execution logic 109 and begin execution.

In the execute stage, issued operations are executed by the functional units of the execution/retire logic 109 of the CPU/Core 102.

In the retire stage, the results of one or more operations produced by the execution/retire logic 109 are stored by the CPU/Core 102 as transient result operands for use by one or more other operations in subsequent issue/execute cycles.

The execution/retire logic 109 includes a number of functional units (FUs) which perform primitive steps such as adding two numbers, moving data from the CPU proper to and from locations outside the CPU such as the memory hierarchy, and holding operands for later use, all as are well known in the art. Also within the execution/retire logic 109 is a connection fabric or interconnect network connected to the FUs so that data produced by a producer (source) FU can be passed to a consumer (sink) FU for further storage or operations. The FUs and the interconnect network of the execution/retire logic 109 are controlled by the executing program to accomplish the program aims.

During the execution of an operation by the execution logic 109 in the execution stage, the functional units can access and/or consume transient operands that have been stored by the retire stage of the CPU/Core 102. Note that some operations take longer to finish execution than others. The duration of execution, in machine cycles, is the execution latency of an operation. Thus, the retire stage of an operation can be latency cycles after the issue stage of the operation. Note that operations that have issued but not yet completed execution and retired are "in-flight." Occasionally, the CPU/Core 102 can stall for a few cycles. Nothing issues or retires during a stall and in-flight operations remain in-flight.

FIG. 3 is a schematic diagram illustrating the architecture of an illustrative embodiment of the execution/retire logic 109 of the CPU/Core 102 of FIG. 1 according to the present disclosure, including a number of functional units 201. The execution/retire logic 109 also includes a set of operand storage elements 203 that are operably coupled to the functional units 201 of the execution/retire logic 109 and configured to store transient operands that are produced and referenced by the functional units of the execution/retire logic 109. An interconnect network 205 provides a physical data path from the operand storage elements 203 to the functional units that can possibly consume the operand stored in the operand storage elements. The interconnect network 205 can also provide the functionality of a bypass routing circuit (directly from a producer functional unit to a consumer function unit).

Figure 4:
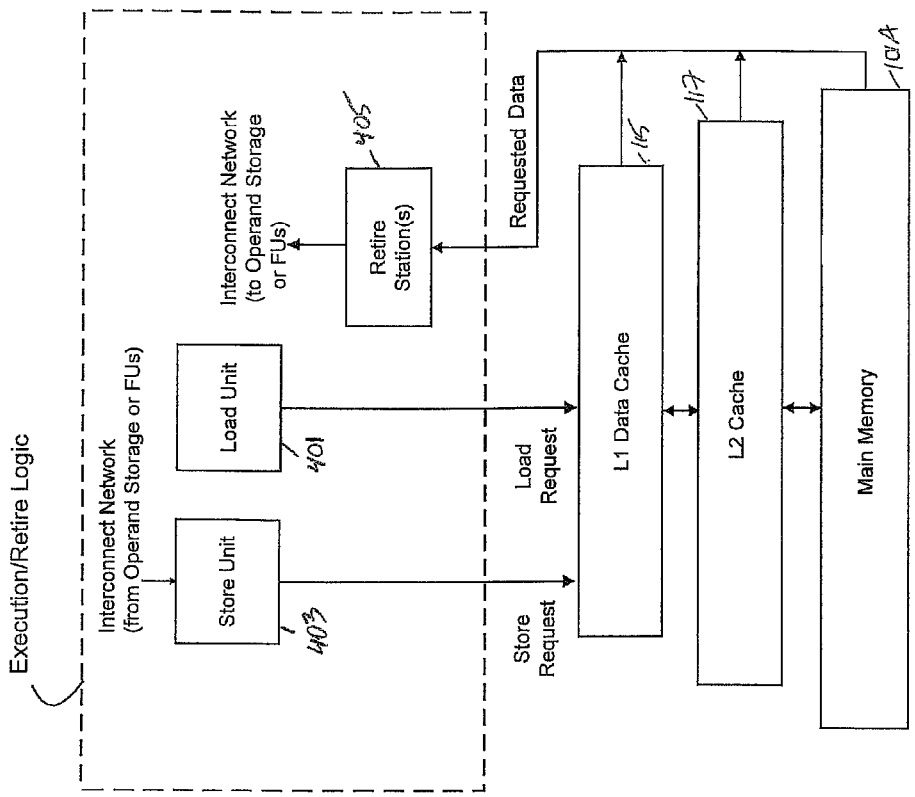
FIG. 4 is schematic illustration of components that can be part of the execution/retire logic and hierarchical memory system of the computer processor of FIG. 1 according to an embodiment of the present disclosure.

In one embodiment shown in FIG. 4, the memory hierarchy of the CPU/Core 102 includes several levels of cache, such as L1 data cache 115 (for example, with an access time of three machine cycles) and an L2 instruction/data cache 117 (for example, with an access time of 10 machine cycles), as well as main memory 101A (for example, with an access time of 400 machine cycles). Other memory hierarchy organizations and access times can also be used. The functional units of the execution/retire logic 109 includes a load unit 401 and a store unit 403 as shown. Load operations are decoded by the decode stage 107 and issued for execution by the load unit 401, which issues a load request corresponding to the decoded load operation to the L1 Data Cache 115. The address for the load request can be provided directly from the machine code of the load operation. Alternatively, the address for the load request can be provided from the operand storage (via the interconnect network 205) at a reference specified by the machine code of the load operation. Store operations are decoded by the decode stage 107 and issued for execution by the store unit 403, which issues a store request corresponding to the decoded store operation to the L1 Data Cache 115. The address for the store request can be provided directly from the machine code of the store operation. Alternatively, the address for the store request can be provided from the operand storage (via the interconnect network 205) at a reference specified by the machine code of the store operation. The operand data for the store request can be provided from the operand storage (via the interconnect network 205) at a reference specified by the machine code of the store operation.

The execution/retire logic 109 also includes retire stations 405, which are hardware units that are able to hold the address of a load operation and possibly buffers the result data as it arrives from the memory hierarchy. The number of retire stations 405 can vary. Each retire station 405 is capable of handling one potential in-flight load operation. A load operation contains arguments that specify a memory address and possibly the width and scalarity of the desired data. Thus, a load operation may request to load a byte from address 0x123456789. The load operation is decoded and issued for execution by the load unit 401. When executing the load operation, the load unit 401 allocates a retire station 405 from the available pool of retire stations. The load unit 401 also sends the station number of the allocated retire station with the address and width as part of a load request to the LI Data Cache.

The L1 data cache 115 services the load request by returning all (or part) of the requested data that hits in the L1 data cache 115 to the allocated retire station 405. If the requested data is not found (misses) in L1 data cache 115, the missing part(s) of the requested data are requested from the next level in the memory hierarchy (the L2 cache 117 and so on) until it is located and returned to the allocated retire station 405. The allocated retire station 405 can buffer the requested data, if need be. The retire station 405 can output the stored requested data over the interconnect network 205 for storage in the fast operand storage 203 of the execution/retire logic 109, and then clears its state, and waits to be allocated again by another load operation.

Figure 5A:
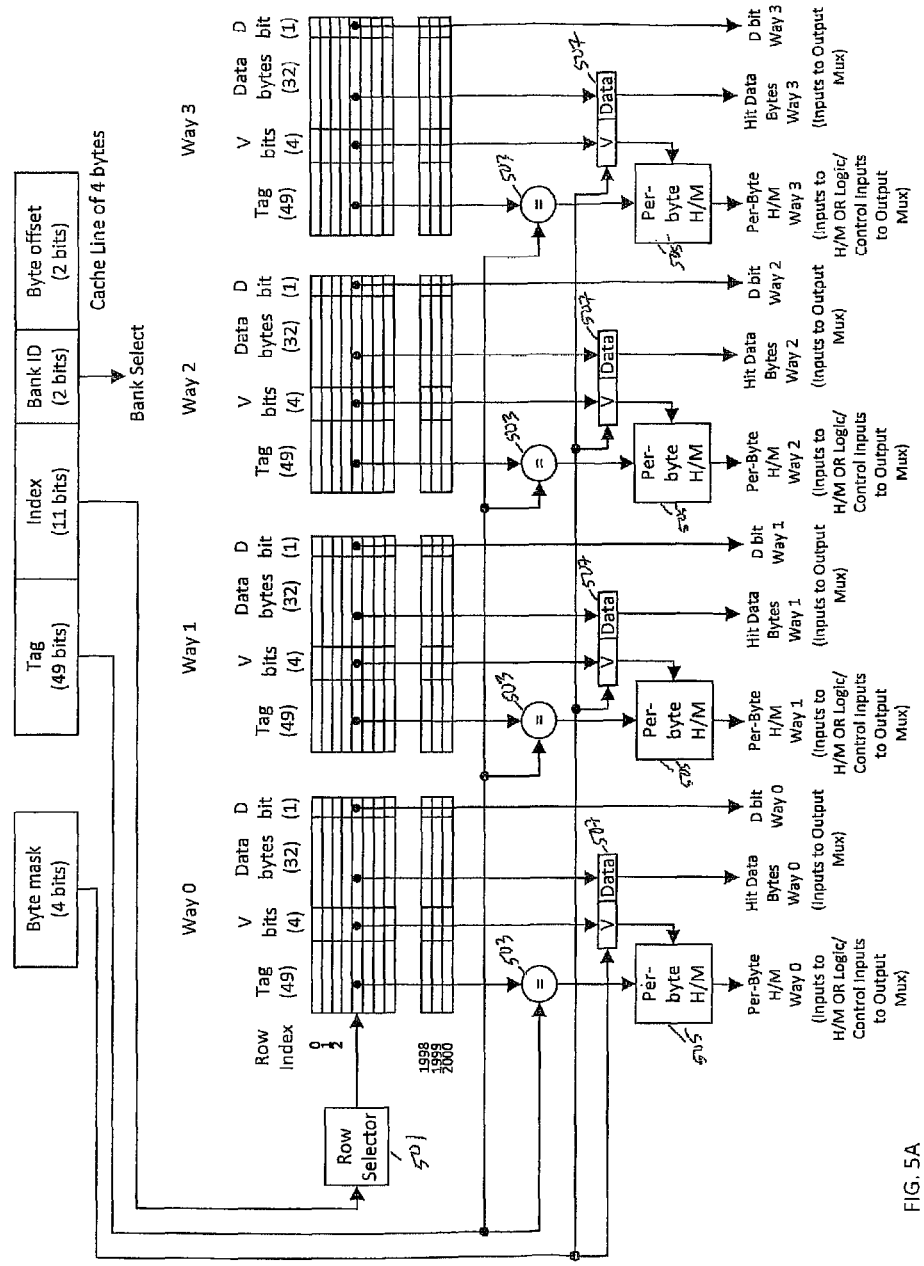
FIG. 5A is a schematic diagram of a bank of an exemplary cache memory structure, which can form part of the L1 Data Cache 115 and the L2 Cache 117 of the hierarchical memory system of FIG. 4 in accordance with the present disclosure.

FIG. 5A is a schematic diagram of a bank of an exemplary cache memory structure, which can form part of the cache memory for the L1 Data Cache 115 and the L2 Cache 117 of FIG. 4 in accordance with the present disclosure. In this example, the bank is an 8 KB array realized by a 4-way set associative structure of 4 byte cache lines. A cache line is addressed by a 64-bit address that includes 2 bits for the byte offset, 2 bits for the bank identifier (in this case, the cache includes 4 banks that are individually selected by the corresponding bank identifier, an 11-bit index to select one of the 2000 rows of the array, and a 49-bit tag as shown. The byte mask for the load request includes 4 bits that correspond to the 4 bytes of the requested cache line.

The 64-bit cache line address and byte mask are used to lookup the cache line from the cache structure as part of the processing of a load request or store request as follows. The bank identifier of the cache line address is used to select one of the four banks of the cache. Each one of the four ways of the respective bank includes 2000 rows corresponding to a row index. Each row is an array structure that stores the data pertaining to a corresponding cache line, including a tag storage part for storing the 49-bit tag of the cache line, a valid-bit part for storing the 4 valid bits corresponding to the 4 bytes of the cache line, a data byte part for storing the 4 bytes of data of the cache line, a dirty bit part for storing the single dirty bit of the cache line. The index of the cache line address is supplied to the row selector circuit 501, which generates a row select signal according to the index of the cache line address in order to access the corresponding row of the four ways of the selected bank.

In each way, the tag of the selected row is read out and supplied to a tag comparator circuit 503, which compares the read-out tag to the tag of the address to generate a signal that indicates whether the tags match one another. This signal is supplied to per-byte hit/miss logic 505 as described below. The byte mask of the address is supplied to read-out control circuit 507 as shown. This read-out control circuit 507 has two parts. One part (labeled "V") reads out one or more valid bits of the selected row of the way corresponding to the one or more bytes selected by the byte mask. For those bytes not selected by the byte mask, an "invalid" bit signal is used. The signals output by this part "V" are supplied to the per-byte hit/miss logic 505 as described below. The other part (labeled "Data") reads out one or more data bytes from the selected row of the way corresponding to the byte mask. For those bytes not selected by the byte mask, it outputs an "invalid" data value. The data values output by this part "Data" is supplied to the output mux circuit 509 of FIG. 5C. The dirty bit of the selected row is also read out and supplied to the output mux circuit of FIG. 5C. In this manner, the read-out control circuit 507 operates to read out the valid bit(s) and data byte(s) stored by the cache for putative matching cache lines for those data bytes that are specified by the byte mask of the load request, while ignoring the valid bit(s) and data byte(s) for such putative matching cache lines for those data bytes that are not specified by the byte mask of the load request. Thus, the valid bit(s) and corresponding data byte(s) as specified by the byte mask for putative matching cache lines are read out from the cache, and the valid bit(s) and corresponding data byte(s) that are not specified by the byte mask for putative matching cache lines are not read out from the cache.

The per-byte hit/miss logic 505 of the respective way generates a per-byte hit/miss signal based on the output signal supplied by the tag comparator circuit 503 and the valid/invalid bits output signals supplied by the read-out control circuit 507. The hit/miss signal for a given byte of data of the requested cache line represents a hit if the output signal of the tag comparator circuit 503 indicates that the tags match and the valid/invalid bit output signal supplied by the read-out control circuit 507 indicates that that the byte is valid (and also selected by the byte mask). The per-byte hit/miss signals generated by logic 505 are supplied as inputs to per-byte OR logic 511 of FIG. 5B. These per-byte hit/miss signals are supplied as control inputs to the output mux circuit of FIG. 5C.

Figure 5B:
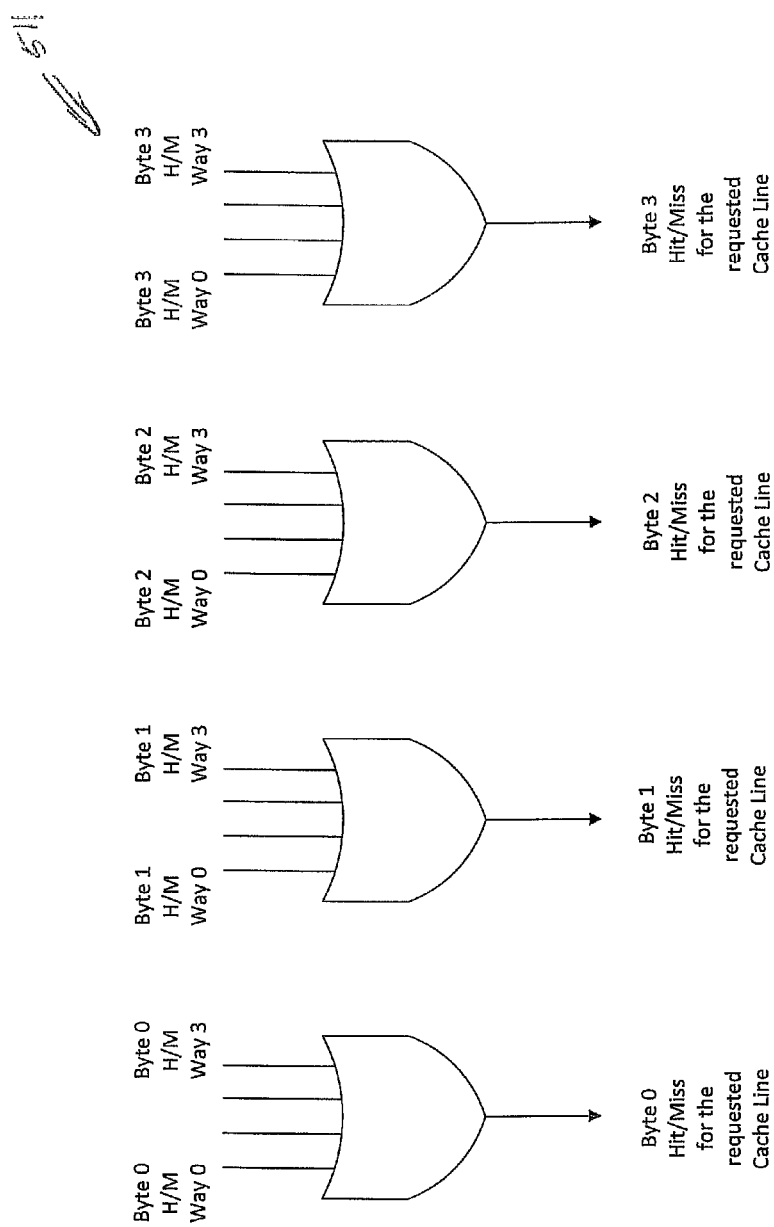
FIG. 5B is a schematic diagram of Hit/Miss OR Logic that is part of the bank of the cache memory structure of FIG. 5A.

As shown in FIG. 5B, the per-byte OR logic 511 includes a 4 input OR gate for each data byte. The OR gate for the "byte 0" data byte outputs the OR function of the byte 0 hit/miss signals for the 4 ways of the bank to generate a hit/miss signal for the requested "byte 0" data byte with respect to the cache lines of the entire bank. The OR gate for the "byte 1" data byte outputs the OR function of the byte 1 hit/miss signals for the 4 ways of the bank to generate a hit/miss signal for the requested "byte 1" data byte with respect to the cache lines of the entire bank. The OR gate for the "byte 2" data byte outputs the OR function of the byte 2 hit/miss signals for the 4 ways of the bank to generate a hit/miss signal for the requested "byte 2" data byte with respect to the cache lines of the entire bank. The OR gate for the "byte 3" data byte outputs the OR function of the byte 3 hit/miss signals for the 4 ways of the bank to generate a hit/miss signal for the requested "byte 3" data byte with respect to the cache lines of the entire bank.

Figure 5C:
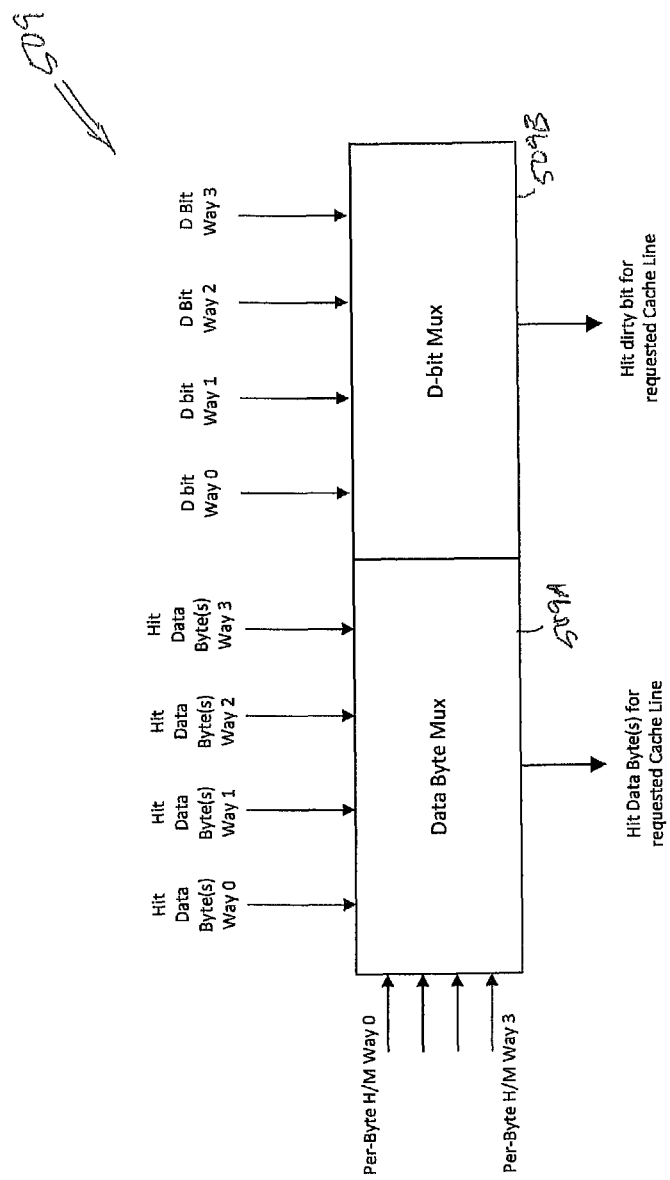
FIG. 5C is a schematic diagram of an output multiplexer circuit that is part of the bank of the cache memory structure of FIG. 5A.

As shown in FIG. 5C, the output mux circuit 509 has two parts 509A and 509B. Both parts 509A and 509B use the per-byte hit/miss signals output by the per-byte hit/miss logic 505 of the four ways as control inputs. The first part 509A (labeled "Byte Mux") outputs one or more data bytes read-out from of a select way as supplied by the read-out circuits of the 4 ways in accordance with such per-byte hit/miss signals. Note that only one of the ways can possibly hit in a given lookup operation and thus and the one or more data bytes of the way that hits will be output by the Byte Mux part 509A. The second part 509B (labeled "D-bit Mux) outputs a dirty bit read out from the selected way as supplied by the read-out circuits of the 4 ways in accordance with the per-byte hit/miss signals. As described above, only one of the ways can possibly hit in a given lookup operation and thus the one dirty bit of the way that hits will be output by the D-bit Mux part 509B.

Figure 6:
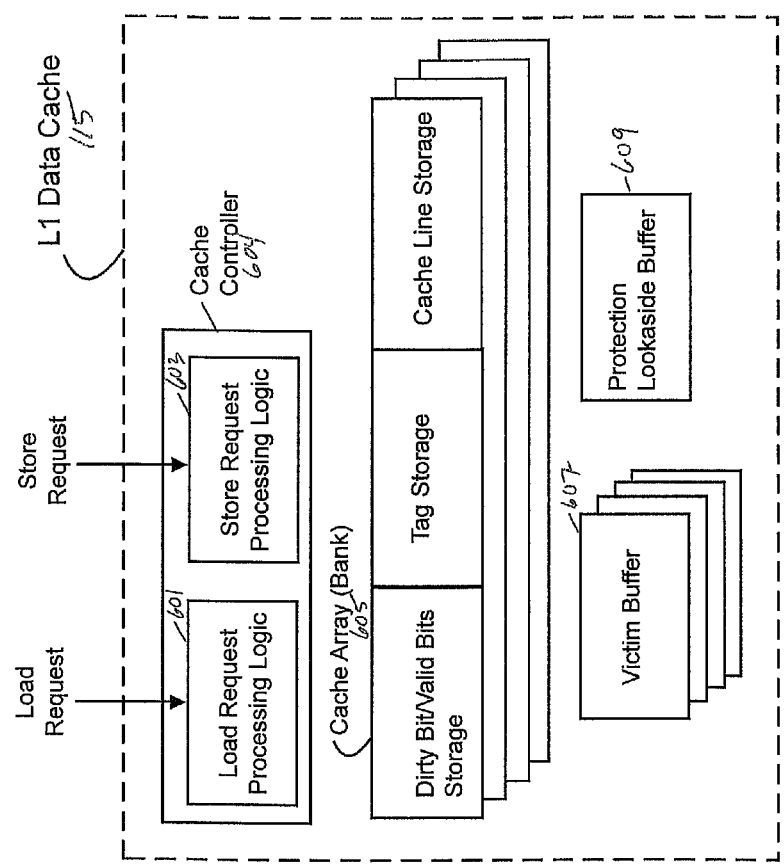
FIG. 6 is a schematic high level diagram of an exemplary L1 Data Cache in accordance with the present disclosure.

FIG. 6 is a schematic high level diagram of an exemplary L1 Data Cache 115 in accordance with the present disclosure. It includes load request processing logic 601 and store request processing logic 603 that are part of a cache controller 604. It also includes a number of cache arrays or banks 605 and corresponding victim buffers 607, and a protection lookaside buffer 609. The load request processing logic 601 receives load requests and processes such load requests to perform lookup operations of the cache structures as described below with respect to FIGS. 7A and 7B. The load request processing logic 601 also cooperates with the lower level cache of the memory hierarchy when data bytes are hoisted to the cache as described below with respect to FIG. 8. The store request processing logic 603 receives store requests and processes such store request to perform data store and lookup operations of the cache structures as described below with respect to FIG. 9. The store request processing Logic 603 also cooperates with the lower level cache of the memory hierarchy to lower valid dirty data as described below with respect to FIG. 10.

The cache arrays (banks) 605 are set-associative structures with rows that store the data pertaining to a corresponding cache line as described above with respect to FIGS. 5A-5C.

The victim buffers 607 are fully-associative structures whose entries each hold the tag, the data bytes, the valid bits for corresponding data bytes of the cache line, and the dirty bit of the cache line. Each victim buffer entry can also hold an unshadowed bit that indicates whether the data byes of the cache line are not duplicated in the corresponding bank of the cache. Note that same cache line may exist in both the victim buffers and the cache arrays (banks) 605. The victim buffers can be readily available, fully associative and fast, whereas the cache arrays (banks) can be subject to contentions from other requests, not fully associative, and slower than the victim buffers. Consequently store requests can be configured to store the cache line in the victim buffer (possibly newly allocated for the purpose), and then only later as capacity permits is the cache line as stored in the victim buffer moved to or merged into the cache arrays (banks). This can occur when a dirty cache line already in the cache arrays (banks) is written to. The new data is written to a cache line allocated in the victim buffer, with the rest of that cache line invalid. The unshadowed bit tells whether there is a corresponding cache line in the cache arrays (banks) or not (shadowed means that there is a line in the banks). In a subsequent load request, if the load is not satisfied by a hit in the victim buffer, then the unshadowed bit of the cache line is used to initial access into the cache arrays (banks) (or in the next lower cache next if it misses in the arrays (banks)). In addition, the unshadowed bit is used for background tasks to indicate that the cache line needs to be copied from the victim buffer into the cache arrays (banks). Once an unshadowed and dirty cache line has been moved from the victim buffer to the cache arrays (banks) and there is a need to allocate space for a new cache line in the victim buffer, the shadowed cache line can be discarded (as a copy exists in the cache arrays (banks). The background task can work to copy all unshadowed cache lines so that it can allocates space for a number of cache lines in the event that a burst of store requests occur.

The victim buffers 607 are accessed by matching the tag of the cache line address to the tag of the entry. The victim buffers 607 are used to hold newly written store queue entries (resulting from store requests) as well as least-recently-used (LRU) cache lines evicted from the banks 605 of the cache. As described below with request to operations of FIGS. 7A to 10, store requests are handled by writing the data of the store request only to a victim buffer, which involves setting the dirty bit for the cache line and the valid bytes for each byte written. The new dirty line and newly touched evicted lines swap into the banks of the cache using spare bandwidth and evicting the LRU cache line of the corresponding row. Dirty evicted cache lines are lowered down to the cache hierarchy. Also, store requests overwrite corresponding clean evicted cache lines that are stored in the victim buffers.

The protection lookaside buffer 609 provides for access control, restricting the kind of access and the address space accessible by the program. The address space of the program can employ virtual memory, which provides for two different purposes in modern CPUs. One purpose, hereinafter paging, permits the totality of the address spaces used by all programs to exceed the physical memory attached to the machine. The other purpose, hereinafter address extension, permits the totality of the address spaces used by all programs to exceed the address space supported by the hardware.

Paging can be used to map the virtual addresses used by the program at page granularity to physical addresses recognized by external backing memory or to devices such as disk that are used as paging store. A program reference to an unmapped virtual address is treated as an error condition and reported to the program using a variety of methods, but usually resulting in program termination. The set of valid virtual addresses usable without error by a program is called its address space. The address mapping is represented by a set of mapping tables maintained by the operating system as it allocates and de-allocates memory for the various running programs. Every virtual address must be translated to the corresponding physical address before it may be used to access physical memory. Systems with caches differ in whether cache lines are known by their physical address (physical caching) or virtual address (virtual caching). In the former, virtual addresses must be translated before they are used to access cache; in the latter, translation occurs after cache access and is avoided if the reference is satisfied from cache.

Address extension is not needed when the space encompassed by the representation of a program address is large enough. Common representations of program address space are four bytes (32 bits) and eight bytes (64 bytes). The four-byte representation (yielding a four gigabyte address space) is easily exceeded by modern programs, so addresses (and address spaces) must be reused with different meanings by different programs and address extension must be used. Reuse of the same address by different programs is called aliasing. Hardware must disambiguate aliased use of addresses before they are actually used in the memory hierarchy. In physical caches, alias disambiguation must occur prior to the caches. In virtual caches, disambiguation may occur after the caches if the caches are restricted to hold only memory from a single one of the aliased addressed spaces. Such a design requires that cache contents be discarded whenever the address space changes, and is of historical interest only. However, the total space used by even thousands of very large programs will not approach the size representable in 64 bits, so aliasing need not occur and address extension is unnecessary in 64-bit machines. A machine that does not use address extension permits all programs to share a single, large address space; such a design is said to use the single-address-space model.

It happens that the same hardware can be used both to disambiguate aliases and to map physical memory, and such is the common arrangement. Because alias disambiguation is typically performed prior to physical caches, using the common hardware means that page mapping occurs their too. When paging and alias disambiguation are in front of physical caches, it is also common to use the same hardware for access control, restricting the kinds of access and the addresses accessible to the program. The hardware enforced restrictions comprise the protection model of the processor and memory system. Protection must apply to cache accesses, so the protection machinery must be ahead of the caches. Hence it is common to have one set of hardware that intercepts all accesses to the memory hierarchy and applies protection restriction, alias disambiguation, and page mapping all together. Because all this must be performed for every reference to memory, and specifically must be performed before cache can be accessed, the necessary hardware is power hungry, large and on the critical path for program performance.

The architecture of the processor and memory system of FIGS. 4 and 6 presumes the use of virtual caches with a very large single address space shared by all programs including the operating system. In this context, aliasing does not exist so alias disambiguation is unnecessary. Page mapping can be performed after all the virtual caches using hardware specific to the purpose. The protection model of the system is enforced by the protection lookaside buffer 609. Specifically, the protection lookaside buffer 609 provides for access control, restricting the kinds of access and the addresses accessible to the program. Such access control is enforced before program accesses to cache are allowed to complete. However, the cache access may be carried out in parallel with the protection checking, which removes protection from the program critical path.

Figure 7A:
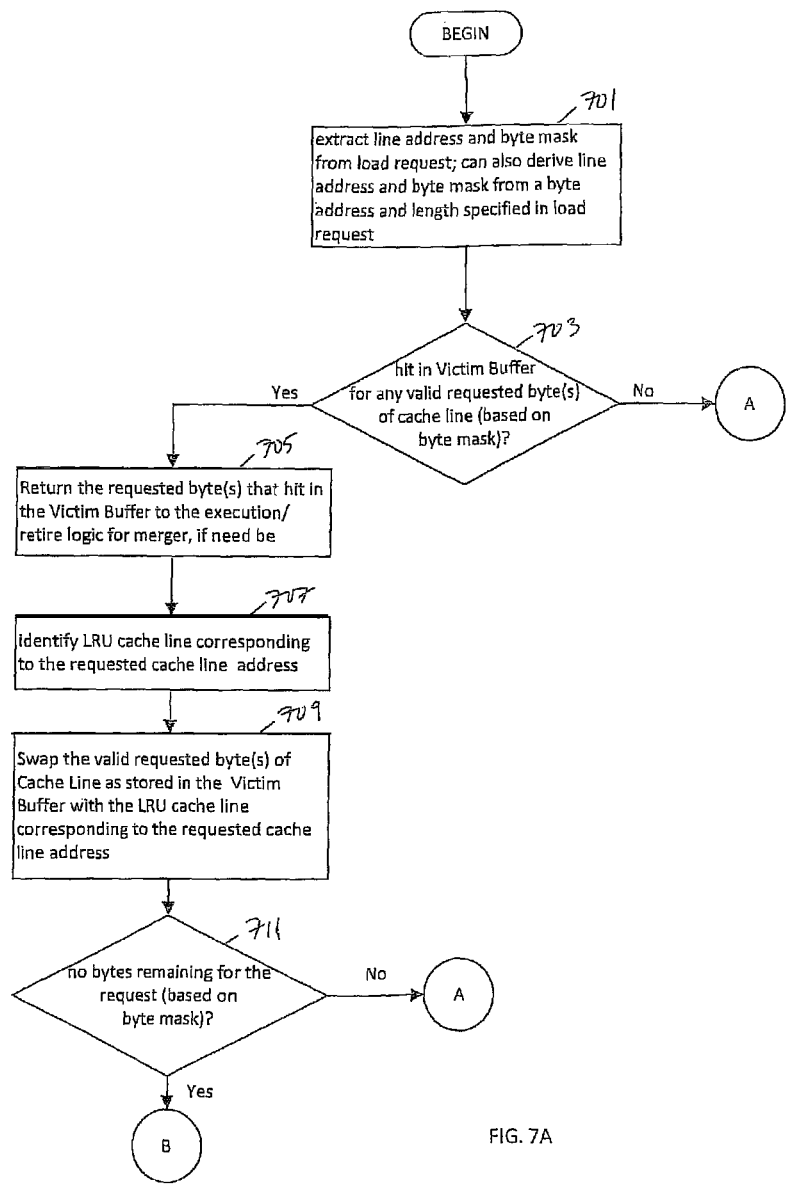
FIGS. 7A-7B, collectively, is a flow chart that illustrates exemplary operations carried out by the computer processor and the L1 Data Cache of FIGS. 4 and 6 in processing a load request.
Figure 7B:
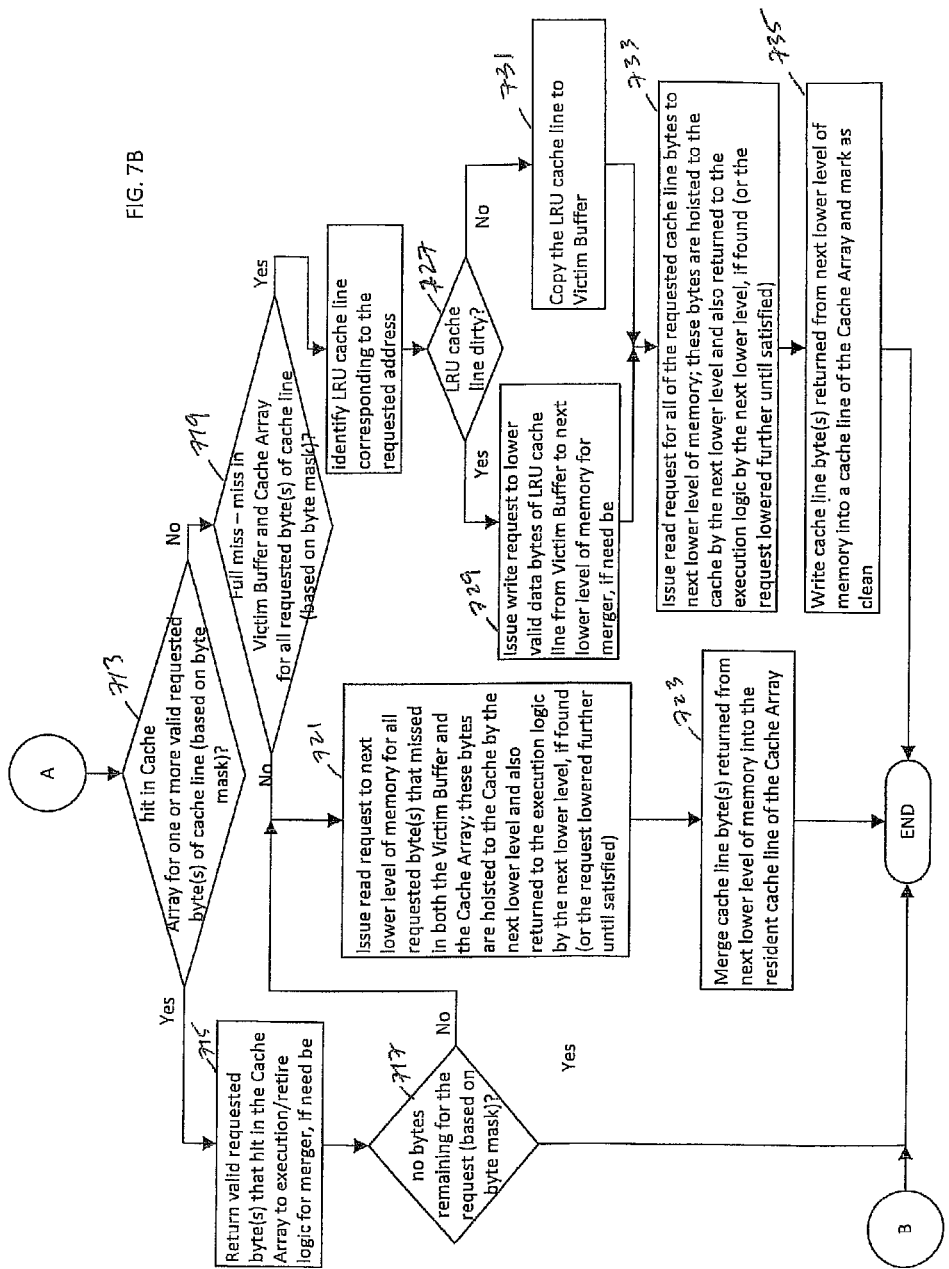

FIGS. 7A-7B, collectively, is a flow chart that illustrates exemplary operations carried out by the L1 Data Cache of FIG. 6 in processing a load request. In block 701, the operations begin where the load request processing logic 601 processes a load request by extracting the cache line address and byte mask from the load request. Alternatively, the cache line address and byte mask can possibly be derived from a byte address and length specified in the load request.

In block 703, the cache line address is looked up in the victim buffer 607 corresponding to the cache line address in order to ascertain if the victim buffer stores any newly written store queue entries or LRU evicted cache lines that correspond to the cache line address and byte mask derived in block 701. In the event that such look up operations result in a hit in the corresponding victim buffer 607 (where the victim buffer stores a cache line whose tag matches the tag of the cache line address with valid bits that identify one or more valid bytes corresponding to the byte mask), the operations continue to blocks 705 to block 711; otherwise, the operations continue to block 713.

In block 705, the valid requested bytes that hit in the victim buffer 607 are returned to the execution/retire logic of the processor for satisfaction of the load request. The returned bytes can be buffered for merger with other returned bytes as described herein. In block 707, the LRU cache line corresponding to the requested cache line address is identified. In block 709, the valid requested byte(s) of the cache line as stored in the victim buffer 607 and such LRU cache line are swapped with one another, thus writing the valid byte(s) of the requested cache line, its tag, valid bits and dirty bit as stored in the victim buffer 607 into the corresponding cache array 605. These operations can be configured to swap newly touched evicted lines swap into the cache arrays 605 using spare bandwidth and evicting the corresponding LRU cache line. In block 711, it is determined whether there are no remaining bytes left to be satisfied (i.e., the valid requested bytes that hit in the victim buffer 607 satisfied all of the bytes requested as defined by the byte mask). If not, the operations continue block 713. If so, the operations end.

In block 713, the cache line address is looked up in the corresponding cache array 605 in order to ascertain if the cache array stores any cache lines that correspond to the cache line address and byte mask derived in block 701. Such lookup operations of the cache array 605 can follow the operations described above with respect to FIGS. 5A to 5C. In the event that such look up operations result in a hit in the corresponding cache array 605 where the cache array 605 stores a cache line whose tag matches the tag of the cache line address with valid bits that identify one or more valid bytes corresponding to the byte mask, the operations continue to blocks 715 and 717; otherwise, the operations continue to block 719.

In block 715, the valid requested bytes that hit in the cache array 605 are returned to the execution/retire logic of the processor for satisfaction of the load request. The returned bytes can be buffered for merger with other returned bytes as described herein. In block 717, it is determined whether there are no remaining bytes left to be satisfied (i.e., the valid requested bytes that hit in the cache array 605 satisfied all of the bytes requested as defined by the byte mask). If not, the operations continue block 721. If so, the operations end.

In block 719, it is determined if there was a full miss—a miss in both the victim buffer and the cache array for all requested bytes of the cache line as specified by the byte mask. If not (full miss false), the operations continue to blocks 721 to 732. Otherwise (full miss true), the operations continue to blocks 725 to 735.

In block 721, the cache issues a read request to next lower level of memory for all requested byte(s) that missed in both the victim buffer 607 and the cache array 605. If satisfied by the next lower level, these bytes are hoisted to the cache by the next lower level and also returned to the execution logic by the next lower level. If not found in the next lower level, the read request is lowered further down the memory hierarchy until satisfied.

In block 723, the cache line bytes that are returned from the next lower level of the memory hierarchy by the hoisting process are merged into the corresponding resident cache line of the cache array as appropriate. As described above, the merger proceeds byte-by-byte based on the corresponding valid bits of corresponding bytes of the two cache lines. If neither cache line has a set valid bit for some byte then the result also does not have the valid bit set and the byte value is undefined. If one cache line has a set valid bit and the other does not, then the result has the valid bit set and the byte value is taken from the cache line in which the byte was marked valid. If both cache lines have the valid bit set, the result will also have the valid bit set, and the byte value will be that of the cache line that was higher in the hierarchical memory system. These rules ensure that a load request, searching from the top of the hierarchical memory system, will find the most recently written value for each byte of the load request. After the merger is complete, the process ends.

Figure 10:
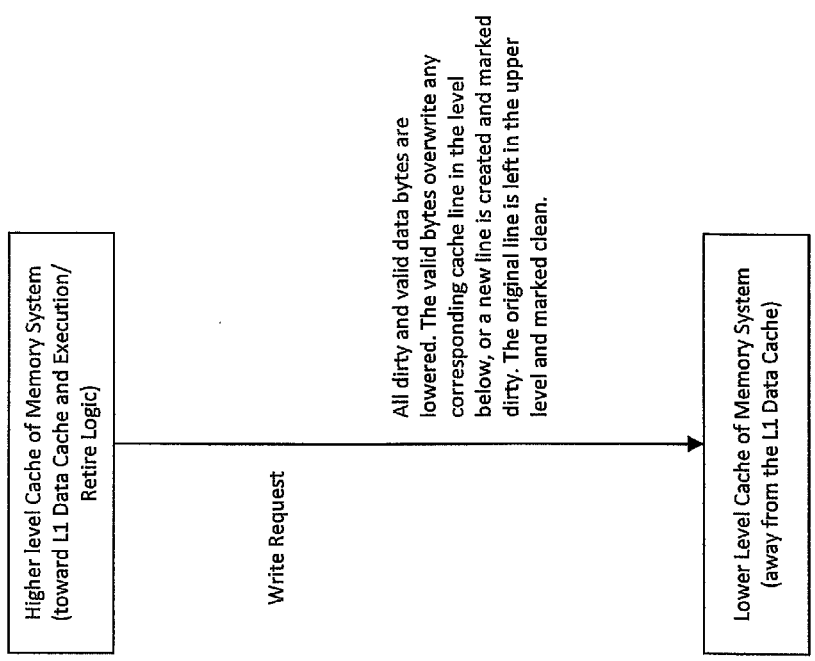
FIG. 10 is a graphical representation of the lowering of store requests within a hierarchical memory system that includes L1 Data Cache of FIG. 6.

In block 725, the LRU cache line corresponding to the requested cache line address is identified. In block 727, the dirty bit for the LRU cache line is checked to determine if it is set to indicate the LRU cache line is dirty. If so (dirty bit set), the operations continue to block 729 to issue a request to lower the valid bytes of the dirty LRU cache line from the victim buffer 607 to the next lower level of memory for merger, if need be (FIG. 10). In this merger process, the valid byte(s) overwrite any corresponding pre-existing cache line in the level below, or a new cache line is created. The original line can remain in the cache and marked clean so that it can be discarded without loss of data. Otherwise (dirty bit not set), the operations continue to blocks 731 to 733.

In block 731, the LRU cache line is evicted from the cache array 605 and stored in the corresponding victim buffer 607. Blocks 729 and 731 continue to block 733 where the cache issues a read request to next lower level of memory for all of requested byte(s). If satisfied by the next lower level, these bytes are hoisted to the cache by the next lower level and also returned to the execution logic by the next lower level. If not found in the next lower level, the load request is lowered further down the memory hierarchy until satisfied.

In block 733, the cache line bytes that are returned from the next lower level of the memory hierarchy by the hoisting process are written as a new cache line in the cache array with the dirty bit cleared (i.e., the cache line is marked clean). After the new cache line is written, the process ends.

Note that in the processing of a load request as described above with respect to FIGS. 7A and 7B, the protection lookaside buffer 609 can be accessed in parallel with the access of the victim buffer 607 and cache array 605 corresponding to the cache line address. The access of the victim buffer 607 and cache array 605 is not allowed to complete unless the protection lookaside buffer 609 allows for access to the requested cache line address. In the event that the protection lookaside buffer 609 generates a fault and thus forbids access to the requested cache line address, the access of the victim buffer 607 and cache array 605 can be aborted and an error flag is returned to the processor, which typically halts execution of the program.

Figure 8:
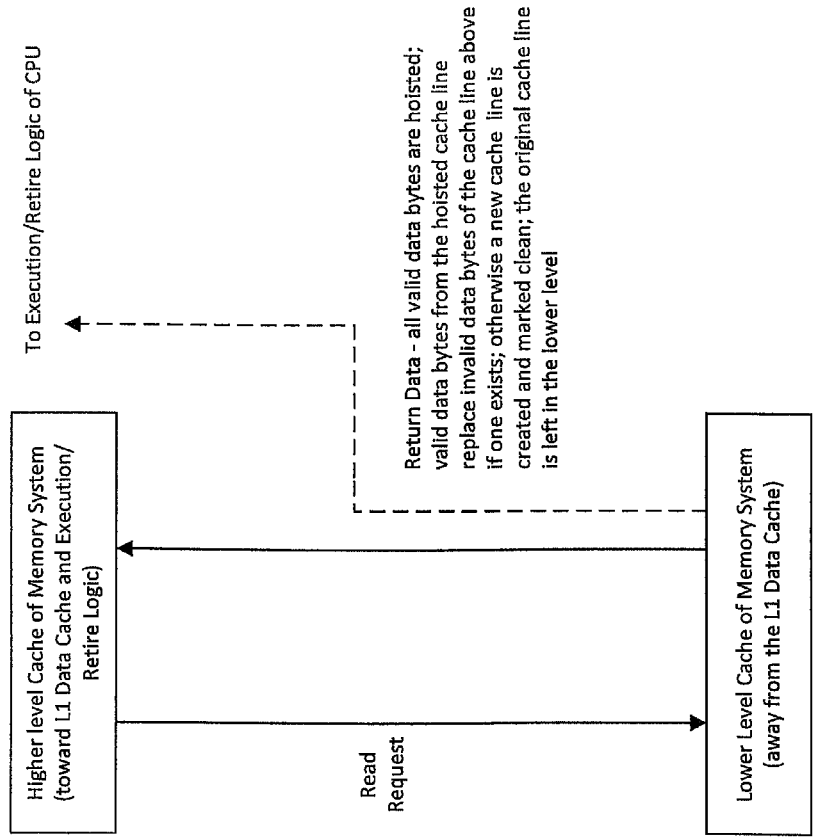
FIG. 8 is a graphical representation of the hoisting of load requests within a memory hierarchical memory system that includes L1 Data Cache of FIG. 6.

FIG. 8 is a graphical representation of the hoisting of data bytes the memory hierarchical memory system that includes L1 Data Cache of FIG. 6. The hoisting process is carried out when a read request hits at any level of the memory hierarchy but the top level. The hoisting process causes all valid bytes of the hit cache line to be hoisted one level up the hierarchy. It can also be configured to cause the valid bytes of the hit cache line to be returned directly to the execution/ retire logic of the CPU. In the hoisting process, the valid data byte(s) from the hoisted cache line are merged with the corresponding resident cache line, if one exists. In this merger process, the valid data bytes replace invalid data bytes of the resident cache line. Any valid data bytes in the resident cache line remain unchanged. If a corresponding resident cache line does not exist in the upper level cache, a new cache line is created and marked not dirty. The original cache line is left in the lower level of the memory hierarchy. The hoisting process can possibly repeat itself up the levels of memory hierarchy such that the valid bytes are populated in the upper levels of the memory hierarchy, if desired.

Figure 9:
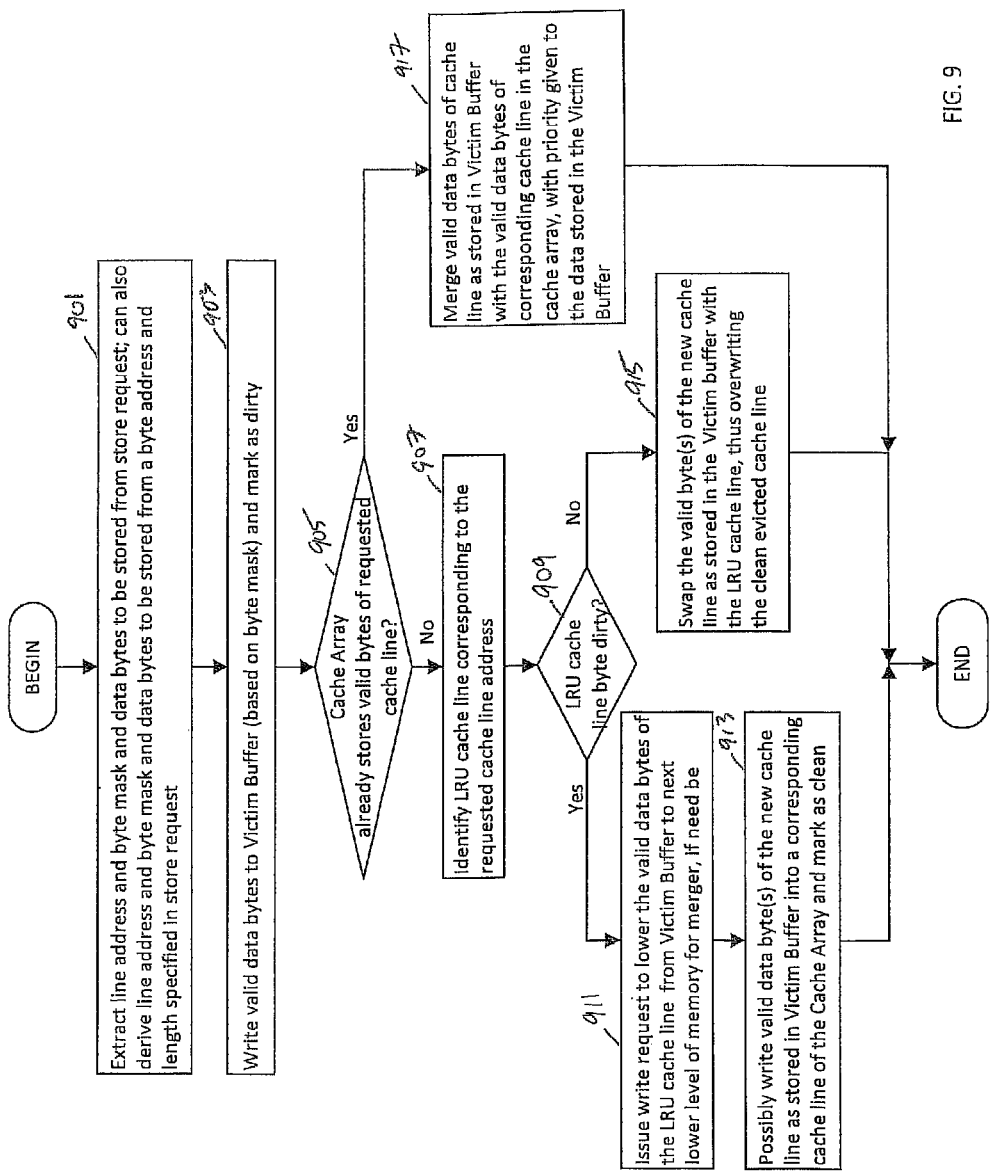
FIG. 9 is a flow chart that illustrates exemplary operations carried out by the computer processor and the L1 Data Cache of FIGS. 4 and 6 in processing a store request.

FIG. 9 is a flow chart that illustrates exemplary operations carried out by the L1 Data Cache of FIG. 6 in processing a store request. In block 901, the operations begin where the store request processing logic 603 processes a store request by extracting the cache line address and byte mask and data bytes to be stored from the load request. Alternatively, the cache line address and byte mask can possibly be derived from a byte address and length specified in the store request.

In block 903, the valid data bytes to be stored as indicated by the byte mask are stored in the victim buffer 607 corresponding to the cache line address with a dirty bit marked dirty.

In block 905, the cache ascertains whether the cache array corresponding to the cache line address already stores valid bytes of the requested cache line. This can involve checking the an unshadowed bit that indicates whether the data byes of the cache line as stored in the victim buffer are not duplicated in the corresponding cache array of the cache. If not, the operations continue to blocks 907 to 915. Otherwise, the operations continue to block 917.

In block 907, the LRU cache line corresponding to the requested cache line address is identified. In block 909, the dirty bit for the LRU cache line is checked to determine if it is set to indicate the LRU cache line is dirty. If so (dirty bit set), the operations continue to blocks 911 and 913. In block 911, the cache issues a write request that lowers the valid bytes of LRU cache line from the victim buffer 607 to the next lower level of memory for merger, if need be. In this merger process, the valid byte(s) overwrite any corresponding pre-existing cache line in the level below, or a new cache line is created. In block 913, the valid byes of the new cache line as stored in the victim buffer can be copied as a new cache line the corresponding cache array and marked as clean.

In block 915, the valid requested byte(s) of the cache line as stored in the victim buffer 607 and such LRU cache line are swapped with one another, thus writing the valid byte(s) of the requested cache line, its tag, valid bits as stored in the victim buffer 607 into the corresponding cache array 605 and marked as clean.

Note that operations of blocks 913 and 915 can be configured to swap new dirty lines into the cache arrays 605 using spare bandwidth and evicting the corresponding LRU cache line.

In block 917, the valid data byte(s) of the cache line as stored in the victim buffer 607 is (are) merged with the valid data bytes of data stored in the corresponding resident cache line, with priority given to the data stored in the victim buffer. This merger proceeds byte-by-byte based on the corresponding valid bits of corresponding bytes of the two cache lines. If neither cache line has a set valid bit for some byte then the result also does not have the valid bit set and the byte value is undefined. If one cache line has a set valid bit and the other does not, then the result has the valid bit set and the byte value is taken from the cache line in which the byte was marked valid. If both cache lines have the valid bit set, the result will also have the valid bit set, and the byte value will be that taken from the victim buffer entry.

Note that in the processing of a store request as described above with respect to FIG. 9, the protection lookaside buffer 609 can be accessed in parallel with the access of the victim buffer 607 and cache array 605 corresponding to the cache line address. The access of the victim buffer 607 and cache array 605 is not allowed to complete unless the protection lookaside buffer 609 allows for access to the requested cache line address. In the event that the protection lookaside buffer 609 generates a fault and thus forbids access to the requested cache line address, the access of the victim buffer 607 and cache array 605 can be aborted and an error flag is returned to the processor, which typically halts execution of the program.

FIG. 10 is a graphical representation of the lowering of data bytes within the hierarchical memory system that includes L1 Data Cache of FIG. 6. In the lowering process, valid data bytes of dirty lines migrate down one level as a result of LRU eviction. In the lowering process, all dirty and valid data bytes are lowered. The valid bytes overwrite any corresponding cache line in the level below, or a new line is created and marked dirty. The original line is left in the upper level of cache and marked clean.

Figure 11:
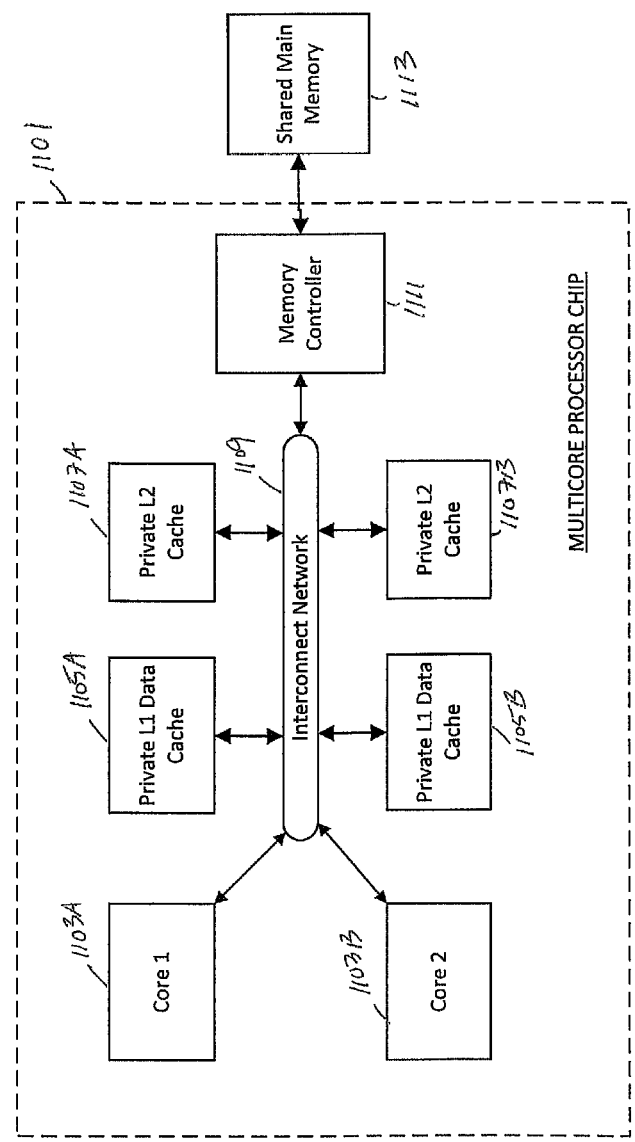
FIG. 11 is a schematic block diagram of an exemplary shared memory multicore processor chip in accordance with the present disclosure.

The improvements described herein can also be extended to shared memory systems where several processors access globally shared memory. These systems include modern multicore chips (chip multiprocessors). In a shared memory system, each of the processors (processor cores) may read and write to a single shared address space. In a shared memory multiprocessor system with private cache memory for each processor, it is possible to have many copies of any one data operand. An exemplary non-limiting shared memory multiprocessor system is shown in FIG. 11, which includes a multicore processing chip 1101 having two processing cores 1103A and 1103B. The processing core 1103A has its own private L1 Data Cache 1105A and Private L2 Cache 1107A. The private L1 Data Cache 1105A and Private L2 Cache 1107A can provide operand data accessible by both the processing core 1103A and the processing core 1103B. The processing core 1103B has its own private L1 Data Cache 1105B and Private L2 Cache 1107B. The private L1 Data Cache 1105B and Private L2 Cache 1107B can provide operand data accessible by both the processing core 1103A and the processing core 1103B. An interconnect network 1109 provides for data paths between the elements as needed. A memory controller 1111 is operably coupled to the interconnect network 1109 and provides access to shared main memory 1113 as shown. In this example, one copy of data could be stored in shared main memory 1113 and copies could be stored in the private L2 caches 1107A and 1107B of each processor. When once copy of the operand data is changes, the other copies of the operand data must also be changed.

For the shared memory machine, the memory consistency model defines the architecturally visible behavior of its memory system. Consistency definitions provide rules about loads and stores (or memory reads and writes) and how they act upon memory. As part of supporting a memory consistency model, the caches and the memory controller of the memory hierarchy employ a cache coherence protocol that ensures that multiple cached copies of data are kept up-to-date.

It is generally agreed that the most natural and easy to use consistency model is the sequential consistency model (or SC). The SC was first formalized by Lamport, who first called a single processor (core) sequential if "the result of an execution is the same as if the operations had been executed in the order specified by the program." Lamport then called a multiprocessor sequentially consistent if "the result of any execution is the same as if the operations of all processors (cores) were executed in some sequential order, and the operations of each individual processor (core) appear in this sequence in the order specified by its program." This total order of operations is called memory order. In the SC, memory order respects each processor's program order, but other less vigorous consistency models may permit memory orders that do not always respect the program orders.

Most of these less rigorous policies make it impossible for a program to determine whether a particular event has occurred or not, or make it indeterminate in which order a pair of events will be seen to have occurred. The problem is most acute in memory access, where many consistency models leave undefined whether a particular store will appear to have occurred before or after a particular load. When both store and load access the same datum, this indeterminacy means that the program cannot know whether a load will return the stored value or the value possessed by the datum prior to the store. The uncertainty makes many algorithms impossible to implement, and is a source of bugs arising when execution order does not match the program order written and expected by the programmer.

To alleviate these problems, many hardware designs supply memory barrier instructions, often shortened to membars. A membar defines a synchronization point in a program; all operations prior to the membar in program order, and none of those after the membar, will be seen to have taken full effect when the membar is executed. The membar operation itself is very expensive, but is only needed when different agents (such as CPUs) must access the same data with consistent ordering. Aside from membar, the hardware is free to reorder operations for greater performance. With judicious and correct use of membar, a system with a weak consistency model can have higher performance than what can be obtained from typical implementations of sequential consistency. Unfortunately, it is extremely difficult to achieve judicious and correct use of membars, and the resulting asynchronous bugs have proven to be hard to reproduce and remove.

In accordance with the present disclosure, the execution/retire logic and the memory hierarchy of the computer processing systems as described herein are adapted to provide full sequential consistency for a shared memory system. This applies to both single core and multicore chips as well as to sequential consistency between chips if the interconnection fabric preserves the ordering. Specifically, the execution/retire logic and the memory hierarchy of each processor of the shared memory system are configured such that there is a defined canonical ordering of memory references as issued by the program, and guarantees that there is no overtaking within the stream of such references, so that the canonical order is preserved all the way to the off-chip fabric.

The canonical ordering of references is determined by the order in which load and store operations are executed by the core, disambiguated as necessary by the architecture definition. It is the responsibility of a compiler or other tool chain to ensure that these operations are encoded in an order which matches the order of operations as specified by the program. It is noted that programming languages vary in their ordering rules, but in all cases the program ordering is expressible in the operation order.

The execution/retire logic of the processor can be embodied by a wide-issue machine where a single instruction can bundle several different operations, possibly including multiple loads, stores, or a mix. Details of an example of such a wide issue machine are described in U.S. patent application Ser. No. 14/290,161, filed on May 29, 2014, commonly assigned to the assignee of the present invention and herein incorporated by reference in its entirety. In this case, there is a textual order of operations within such a bundle. The positions in this order are called slots, and correspond to the execution pipelines that will execute the particular operations. Within an instruction bundle, the canonical order corresponds to slot order; later operations in slot order appear later in the reference request sequence. Thus if two stores in the same instruction reference the same byte in memory the store that is later in slot order will overwrite the store that is earlier in slot order. An instruction bundle can contain a mix of loads and stores. The canonical ordering alternates these; it is as if all loads are executed first, in slot order, and then all stores, also in slot order. That is, a load cannot see a store in its own instruction, but can see the effect of a store in the previous instruction in program order.

Furthermore, the execution/retire logic of the processor can supported deferred load operations as described in U.S. patent application Ser. No. 14/515,058, filed concurrently herewith, commonly assigned to the assignee of the present invention and herein incorporated by reference in its entirety. The deferred load operation is issued in one cycle (the issue cycle) possibly at the same time as other operations in its instruction, but does not retire until a specified number of cycles later (the retire cycle). Thus, if the various delays are specified appropriately, several load operations from different issue cycles may retire together in a single retire cycle. These load operations are all ordered together between any store operation of the instruction before the retire cycle and any store operation of the instruction of the retire cycle itself. That is, the canonical order orders deferred loads as of their retire cycle, not as of their issue cycle. The ordering among load operations of a single retire cycle, having no visible side effects, need not be made canonical. However, a canonical ordering for such load operations can be defined as a consequence of the need to define an ordering for the retiring load result; this ordering is by the amount of deferred delay, and by slot order within equal delay. Each load or store operation is turned into a memory request by the load/store hardware functional unit that executes it. These requests are logically queued to the memory hierarchy.

In the event that there is only one load/store functional unit, the memory requests can be processed in order. In this case, store requests are sent directly to the top level data cache where the operand data is stored in the top level data cache (such as by being written into a victim buffer as described above). Load requests are assigned to a retire station and the requests (with an indicator of the assigned station) are sent to the top level data cache. The retire stations monitor the stream of store requests to detect collisions between earlier loads and later stores. In the event of a collision between a deferred load operation and a later store operation, the retire station ignores the result of the earlier request and either updates its buffer with data from the colliding store, or re-sends another load request for the data. Thus the retire stations see all store operations up to the cycle in which retire takes place, thereby preserving the canonical ordering between store operations and the retire cycles of deferred load operations.

In the event that there are two or more load/store functional units then two or more store operations may issue in the same cycle. If the functional units involved share a data path to the top level data cache, then the requests are time-ordered in the data path; if the design supplies a data path to each functional unit, then order is implicitly defined by which data path is used for which request. The top level data cache include logic that resolves write-write collisions if any occur, such that the data in the cache reflect the update ordering of the canonical ordering. The update process is pipelined such that the values stored will be seen by loads retiring in the following cycle. Because the loads search the memory hierarchy in order, a load operation will necessarily find the most recently written value for each loaded byte, even when (due to the use of valid bits in the cache lines) the loaded bytes are scattered within the hierarchy. Thus within one processor (core) all loads and stores observe the canonical ordering in all cases, resulting in a sequentially consistent memory model within the processor (core) and its attached memory hierarchy.

The multi-processor behavior model depends on the sequential consistency of the behavior models of the individual processors (cores). Each processor (core) is configured to provide a stream of requests (in SC order) to their private caches. The private caches must coordinate with each other to ensure cache consistency. There are many well-known protocols for ensuring relative consistency which will ensure SC if the requests are already SC within their own streams. Many of these protocols require snooping by the private caches into the write stream produced by the associated processor (core). In general all such techniques can be applied.

Certain features of the memory hierarchy of the computer processing systems as described herein permit enhanced coherency protocols if the connection fabric between caches supports them. Most important is the availability of the per-byte valid bits that specify the validity/invalidity of the individual bytes in a cache line. Any of the common protocols, MOESI for example, can be augmented by including a byte mask that specifies the bytes of a cache line that pertain to a given coherence request. This can reduce the granularity of coherence request from that of the cache line to the individual byte.

For example, the private caches of two different processors (cores) can maintain simultaneous shared use of the same cache line, so long as the set of valid bit(s) of the byte(s) of the cache line that are stored by the private cache of one processor are disjoint from the set of valid bit(s) of the byte(s) of the cache line that are stored by the private cache of the other processor. Thus, for example, in this protocol a write to a cache line not in its own private cache (which is implicitly in Invalid state) must first broadcast a "Request to Invalidate" (RFI) message that invalidates any copy of the requested data in other caches, then write to its own cache and enter the Modified state. According to the present disclosure, the RFI message includes both the address of the affected cache line and also the byte mask that indicates the affected bytes of that cache line. This message is sent to all caches that might have a copy of the data. The recipient cache(s) can employ the byte mask to share use of the bytes of the cache line, if appropriate. Specifically, if the byte mask of the received RFI message refers to byte(s) of the cache line that is (are) disjoint from the valid byte(s) of the cache line that is (are) stored in recipient cache, then the recipient cache need not change the state of the cache line nor perform any communication operations, although the protocol may require the return of a minimal acknowledgement response back to the requester cache. If the byte mask of the RFI message refers to byte(s) of the cache line that overlap (are non-disjoint with respect to) valid byte(s) of the cache line that is(are) stored in the recipient cache, then the recipient cache need only mark these overlapping bytes invalid in the cache line. It does not matter what state the cache line was in the recipient cache. This state will remain unchanged unless the RFI message invalidates the last invalid byte in the cache line, in which case the cache line state should be changed to Invalid and its dirty bit, if set, should be cleared. When all responses have been received, the requester cache can be sure that no other cache has the cache line with any valid bytes overlapping the bytes to be written. The requestor cache can then commit to store such data bytes, and the cache line enters the Modified state. The adaptation of this enhancement to other state transitions and other coherency protocols is straightforward and obvious. It is in fact not necessary for the requestor cache to wait for responses to the RFI request. For purposes of the state change, the write can be made into the local cache at once (and the line state changed to Modified) concurrently with the transmission of the RFI message. The other caches will simply invalidate the relevant bytes, and coherency does not require any response, although one may be made to ensure the security of the coherency fabric and the correct receipt of the RFI message.

Note that in prior art machines, the receipt of an RFI message would cause the recipient cache to invalidate the entire cache line, passing the contents of the line back to the requester cache. The pass-back may be directly cache-to-cache over the coherency fabric, or may involve the recipient writing the line back to memory and the requester loading it from memory.

Also note that if the store operations of any single processor (core) exhibit sequential consistency then the enhanced protocol described here will ensure sequential consistency across all processors (cores). The latency of the coherency fabric may be such that another processor core may issue a load request (read) or a store request (write) against the data invalidated by the RFI message either before or after the RFI message is received. If before, then the load request (read) will be satisfied from local cache or the store request (write) will modify the local cache, only to be discarded by the RFI message. If after, the load request (read) must use the coherency protocol to obtain a current (after the RFI message) copy of the data, while the store request (write) will simply update the line and send its own RFI message.

As with any coherency protocol, the enhanced protocol as described herein must deal with race conditions in the interconnection fabric between caches. Whether races are possible depends on the fabric implementation, and is outside the scope of this disclosure. For example, the fabric on multicore chip may be a single bus that is snooped by all and handles only one request at a time. In such a fabric, races are impossible and the enhanced protocol works as described. In a different implementation, the fabric may be a point-to-point network with non-zero latency, and it is possible for two requests to cross each other in transit. In such a case, two different caches may each send a RFI message for the same data to each other at the same time, leading both caches to invalidate the data, resulting either in stale data in memory becoming the active copy, or even complete loss of data if the cache line is backless.

All fabrics implement mechanisms to avoid such races. For example, the fabric may record the address of an issued RFI message and require an acknowledgement in response. If an RFI message comes in for the same address while not all acknowledgements have been received then the fabric may refuse the RFI message rather than invalidating the local copy in cache, forcing the two caches involved to negotiate an ordering between them. Similar stratagems apply to other fabric designs; the particular implementation is beyond the scope of this disclosure.

The enhanced cache coherency protocol as described herein has two significant advantages.

First, because the private caches for two different processors (cores) may hold the same cache line in a modified state so long as the sets of valid bits held by the private caches for the two different processors are disjoint with respect to one another, the phenomena of false sharing cannot occur. False sharing arises when by accident of data layout two processors (cores) reference disjoint data (no true sharing of data) that happen to lie in the same cache line. In a conventional protocol, the line will ping-pong back and forth between the two cores as each modifies its own part. This ping-ponging is expensive in latency, power and bandwidth, and is avoided here. Instead, the cache line ownership transfers only when a datum in the cache line is actually shared by more than one processor (core).

A second advantage is that a load request (read) can be satisfied by transmitting only the bytes needed and not a whole line. Furthermore, the maximal number of bytes in a load request (write) can be defined as less than the line size in most configurations. In this case, the coherency data path can be made smaller than would be required without the enhancements, which saves power and area. Of course, if several items in the same cache line are to be shared, it may take several protocol exchanges to build up the full sharing, which will counterbalance some of the gain. However, typical program usage is for shared items, for example locks, to be smaller than a full cache line.

There have been described and illustrated herein several embodiments of a computer processor and corresponding method of operations. While particular embodiments of the invention have been described, it is not intended that the invention be limited thereto, as it is intended that the invention be as broad in scope as the art will allow and that the specification be read likewise. For example, the microarchitecture and memory organization of the CPU 101 as described herein is for illustrative purposes only. A wide variety of CPU microarchitectures can embody the improvement and methods described herein, including microarchitectures that employ in-order execution, microarchitectures that employ out-of-order execution, superscalar microarchitectures, VLIW microarchitectures, single-core microarchitectures, multi-core microarchitectures, and combinations thereof. In another example, the functionality of the CPU 101 as described herein can be embodied as a processor core and multiple instances of the processor core can be fabricated as part of a single integrated circuit (possibly along with other structures). It will therefore be appreciated by those skilled in the art that yet other modifications could be made to the provided invention without deviating from its spirit and scope as claimed.

What is claimed is:
1. A computer processing system comprising:
a hierarchical memory system having at least one cache; and
a processor having execution logic that generates load memory requests that are supplied to the hierarchical memory system;
wherein the at least one cache stores a plurality of cache lines as well as a plurality of valid bits for each cache line, wherein each cache line includes a plurality of data bytes, and wherein the plurality of valid bits for a given cache line correspond to the plurality of data bytes of the given cache line and provide an indication of the validity of the corresponding data bytes of the given cache line;

wherein each given load memory request includes a cache line address that specifies a particular cache line as well as a request byte data that specifies at least one particular data byte of the cache line specified by the cache line address, and the cache is configured to process the given load memory request by i) accessing at least one cache line stored by the cache that putatively matches the cache line address of the load memory request, and ii) processing the valid bits of the accessed cache line together with the request byte data in order to output from the cache for supply to the execution logic only valid data bytes of the accessed cache line for those data bytes specified by the request byte data of the memory request.

2. A computer processing system according to claim 1, wherein:
the request byte data comprises a byte mask with a number of bits that equal the number of data bytes in a given cache line.

3. A computer processing system according to claim 1, wherein:
the at least one cache is an associative structure that stores the plurality of cache lines along with a tag for each cache line; and
the at least one cache is further configured to process the load memory request by comparing the tag of the cache line address of the memory request to the tag of the cache line stored by the cache that putatively matches the cache line address of the memory request.

4. A computer processing system according to claim 3, wherein:
the at least one cache is further configured to generate a plurality of per-byte hit/miss signals based on the processing of the valid bits of the accessed cache line and the tag comparison of the tag of the accessed cache line, wherein the plurality of per-byte hit/miss signals correspond to the number of data bytes in a given cache line.

5. A computer processing system according to claim 4, wherein:
each per-byte hit/miss signals indicates whether the cache stores a corresponding valid data byte for the cache line corresponding to the cache line address but only for those data bytes specified by the request byte data.

6. A computer processing system according to claim 3, wherein:
the associative structure further stores a dirty bit for each cache line, wherein the dirty bit is used when evicting the corresponding cache line to determine whether the cache line should be lowered to a lower level of the hierarchical memory system.

7. A computer processing system according to claim 3, wherein:
the associative structure is one of a set-associative structure with a plurality of ways and a fully-associative structure.

8. A computer processing system according to claim 1, wherein:
the execution logic of the processor further generates store memory requests that are supplied to the hierarchical memory system, wherein each store memory request includes a cache line address that specifies a particular cache line as well as a request byte data that specifies at least one particular data byte of the cache line specified by the cache line address.

9. A computer processing system according to claim 8, wherein:

the at least one cache includes at least one buffer and at least one cache array for storing cache lines;
wherein the at least one buffer stores valid data bytes for newly written cache lines as well as cache lines newly evicted from the at least one cache array.

10. A computer processing system according to claim 9, wherein:
the at least one cache processes a store memory request by writing the valid data bytes provided as part of the store memory request to the at least one buffer and marking such data bytes as dirty.

11. A computer processing system according to claim 10, wherein:
in the event that the at least one cache array stores valid data bytes for the cache line specified by the store memory request, the at least one cache further processes the store request by merging valid data bytes of the cache line as stored in the buffer with the valid data bytes stored in the at least one cache array.

12. A computer processing system according to claim 10, wherein:
the at least one cache further processes the store memory request by writing valid data bytes of the cache line as stored in the buffer into the at least one cache array and marking such data bytes as clean.

13. A computer processing system according to claim 10, wherein:
the at least one cache is further configured to lower valid data bytes of an evicted cache line marked as dirty as stored in the at least one buffer to a lower level of the hierarchical memory system.

14. A computer processing system according to claim 13, wherein:
the lower level of the hierarchical memory system is configured to store the valid data bytes of the evicted cache line marked as dirty as lowered by the cache by overwriting any corresponding cache line or creating a new cache line and marking it dirty.

15. A computer processing system according to claim 9, wherein:
the at least one cache is configured to process the given load memory request by accessing both the at least one buffer and the at least one cache array to determine if either one stores valid data bytes for the cache line specified by the cache line address of the given load memory request.

16. A computer processing system according to claim 15, wherein:
the at least one cache further processes a load memory request by issuing a read request to the next lower level in the hierarchical memory system, where the read request specifies a number of data bytes for the requested cache line that missed in both the at least one buffer and the at least one cache array.

17. A computer processing system according to claim 16, wherein:
the lower level of the hierarchical memory system is configured to hoist valid data bytes of the requested cache line as specified in the read request that hit in the lower level of the hierarchical memory system for storage in the at least one cache.

18. A computer processing system according to claim 17, wherein:
the at least one cache is configured to carry out a byte-wide merger process with respect to the valid data bytes for a given cache line as hoisted from the lower level of the hierarchical memory system and the valid data bytes for the given cache line as stored in the at least one cache array.

19. A shared memory multiprocessor system comprising:
a plurality of processors with a hierarchical memory system that includes at least one private cache per processor and shared memory resources;
wherein the at least one private cache of each given processor stores a plurality of cache lines as well as a plurality of valid bits for each cache line, wherein each cache line includes a plurality of data bytes, and wherein the plurality of valid bits for a given cache line correspond to the plurality of data bytes of the given cache line and provide an indication of the validity of the corresponding data bytes of the given cache line;
wherein the private caches of the hierarchical memory system are coupled to one another by an interconnect network; and
wherein the at least one private cache of each given processor is configured to carry out a cache coherence protocol that allows the private caches for different processors to hold the same cache line in modified state so long as the sets of valid bits held by the respective private caches for the different processors are disjoint with respect to one another.

20. A shared memory multiprocessor system according to claim 19, wherein:
in processing a store request for a cache line that is not stored in a given private cache, the cache coherence protocol is configured to broadcast a message that invalidates any copy of particular data bytes of the cache line in other private caches.

21. A shared memory multiprocessor system according to claim 20, wherein:
the message includes an address for an affected cache line and a byte mask that indicates the affected bytes of that cache line.

22. A shared memory multiprocessor system according to claim 21, wherein:
at least one recipient cache that receives the message is configured to use the byte mask to share use of zero or more bytes of the cache line.

23. A shared memory multiprocessor system according to claim 22, wherein:
if the byte mask of the received message refers to one or more bytes of the cache line that are disjoint from one or more valid bytes of the cache line stored in recipient cache, then the recipient cache is configured to not modify the state of the cache line.

24. A shared memory multiprocessor system according to claim 22, wherein:
if the byte mask of the received message refers to one or more bytes of the cache line that overlap one or more valid bytes of the cache line stored in the recipient cache, then the recipient cache is configured to mark the overlapping bytes invalid in the cache line of the recipient cache.

25. A shared memory multiprocessor system according to claim 24 wherein:
if all bytes are marked invalid in the cache line of the recipient cache, then the recipient cache is configured to change the state of the cache line to an invalid state and to clear the dirty bit for the cache line when set.

26. A computer processing system according to claim 1, wherein:
the at least one cache further processes a load memory request by issuing a read request to the next lower level in the hierarchical memory system, where the read request specifies a number of data bytes for the requested cache line that missed in the cache.

27. A computer processing system according to claim 26, wherein:
the lower level of the hierarchical memory system is configured to hoist valid data bytes of the requested cache line as specified in the read request that hit in the lower level of the hierarchical memory system for storage in the cache.

28. A computer processing system according to claim 27, wherein:
the cache is configured to carry out a byte-wide merger process with respect to the valid data bytes for a given cache line as hoisted from the lower level of the hierarchical memory system and the valid data bytes for the given cache line as stored in the cache.

* * * * *